(12) United States Patent
Boles et al.

(10) Patent No.: US 6,599,423 B2
(45) Date of Patent: Jul. 29, 2003

(54) HIGH-EFFICIENCY PROCESSES FOR DESTRUCTION OF CONTAMINANTS

(75) Inventors: Jeffrey L. Boles, Tuscumbia, AL (US); Johnny R. Gamble, Florence, AL (US); Laura Lackey, Macon, GA (US)

(73) Assignee: Tennessee Valley Authority, Knoxville, TN (US)

( * ) Notice: Subject to any disclaimer, the term of this patent is extended or adjusted under 35 U.S.C. 154(b) by 0 days.

(21) Appl. No.: 10/227,416

(22) Filed: Aug. 26, 2002

(65) Prior Publication Data

US 2003/0047508 A1 Mar. 13, 2003

Related U.S. Application Data

(62) Division of application No. 09/624,967, filed on Jul. 24, 2000, now Pat. No. 6,461,510
(60) Provisional application No. 60/145,144, filed on Jul. 23, 1999.

(51) Int. Cl.[7] .................................................. C02F 3/00
(52) U.S. Cl. ....................... 210/606; 210/610; 210/614; 210/616
(58) Field of Search ................................ 210/606, 610, 210/614, 616–617, 618, 615

(56) References Cited

U.S. PATENT DOCUMENTS

| | | |
|---|---|---|
| 4,662,900 A | 5/1987 | Ottengraf |
| 4,869,824 A | 9/1989 | Melin |
| 5,116,506 A | 5/1992 | Williamson |
| 5,217,616 A | 6/1993 | Sanyal |
| 5,232,676 A | 8/1993 | Wolff |
| 5,387,344 A | 2/1995 | McCombs |
| 5,389,248 A | 2/1995 | Pare |
| 5,413,714 A | 5/1995 | DeFilippi |
| 5,540,840 A | 7/1996 | Heitkamp |
| 5,578,214 A | 11/1996 | Yamasaki |
| 5,595,910 A | 1/1997 | Kant |
| 5,597,402 A | 1/1997 | LaPack |
| 5,747,331 A | 5/1998 | Hartikainen |
| 5,935,300 A | 8/1999 | Nieerk |
| 5,954,858 A | 9/1999 | Peretti |
| 5,976,377 A | 11/1999 | Hyfantis |
| 6,048,459 A | 4/2000 | Khudenko |
| 6,069,003 A | 5/2000 | Ahiqvist |
| 6,214,088 B1 | 4/2001 | Karamaney |

*Primary Examiner*—Chester T. Barry
(74) *Attorney, Agent, or Firm*—Sughrue Mion, PLLC; Peter D. Olaxy, P.C.

(57) ABSTRACT

The present invention relates to novel ex situ processes for simple and economical destruction of air, water, and soil contaminants using naturally occurring microorganisms that are widely available in the environment. The processes utilize novel closed-loop recycle schemes which dramatically improve the efficiency, economics, and practicability of destruction of a wide variety of contaminants, especially VOCs and chloroethylenes, and particularly trichloroethylene (TCE). The processes may be applied on a batch or continuous basis to contaminated soil and groundwater, to contaminated effluents from a wide variety industrial operations, or to wherever such amenable contaminants are present. Certain contaminants, particularly chloroethylenes, are known to be difficult to biodegrade aerobically to non-toxic products without the employment of a primary substrate to induce cometabolic degradation. Ordinarily, practical and economical cometabolic degradation of these compounds via a primary substrate is not possible because direct metabolic degradation of the primary substrate itself competes with degradation of the target pollutants, thus rendering degradation of the target pollutants economically prohibitive. The processes of the present invention utilize novel closed-loop recycle schemes and separate primary substrate streams and contaminant streams into separate and discrete process cycles to achieve simple, practical, and economical degradation of target pollutants. Conventional wisdom indicates that these closed-loop recycle schemes should deplete the oxygen supply, causing loss of the aerobic microorganisms and process failure. However, the novel closed-loop recycle schemes of the present invention unexpectedly result in dramatically improved efficiencies and economics for degradation of a wide variety of pollutants, particularly chloroethylenes.

31 Claims, 8 Drawing Sheets

(Invention Processes Drawing)

(Invention Processes Drawing)

Demonstration Unit Operation without Closed-Loop Recycle Feeding

Effect of Delaying Start of Propane Feed in TVA Bench-Scale Biofilter

Effect of Closed System Operation During Part of Feeding Cycle

Zero Effluent TCE and 100% Propane Utilization During Closed-Loop Recycle

Effect of Load on Degradation Rate in Demonstration Unit

Effect of Influent Load on Degradation Rate and Efficiency in
Demonstration Unit with EBCT = 30 Minutes Effect of Breakthrough on Effluent Concentration in Demonstration Unit

HIGH-EFFICIENCY PROCESSES FOR DESTRUCTION OF CONTAMINANTS

This is a divisional of application Ser. No. 09/624,967 filed Jul. 24, 2000, now U.S. Pat. No. 6,461,510; the disclosure of which is incorporated herein by reference. This application claims the benefit of Provisional Application No. 60/145,144 filed on Jul. 23, 1999.

BACKGROUND OF THE INVENTION

1. Field of the Invention

The present invention relates to novel ex situ processes for simple and economical destruction of air, water, and land contaminants.

2. Description of Related Art

Many industrial operations today utilize raw materials, solvents, and cleaners which result in the release of harmful pollutants into the environment. In addition, widespread use and improper disposal of toxic materials in the past have resulted in contamination of many soils and subsurface aquifers with harmful pollutants, particularly chlorinated aliphatic hydrocarbons (Council on Environmental Quality; U.S. Environmental Protection Agency, 1981). The National Priority List of the USEPA lists TCE as one of the most frequently reported contaminants at hazardous waste sites. In rural areas of the U.S., much of the drinking water supply is provided by groundwater. TCE is one of the most prevalent groundwater contaminants (Westrick et al. 1984; Lenhard et al. 1995), and due to the serious health threat these contaminated groundwaters pose, remedial action of such areas are of major concern. Traditional clean-up methods for contaminated water include air-stripping or air-stripping followed by granulated-activated carbon (GAC) adsorption. In either case, the contaminants are only transferred from one medium to another and must still be dealt with. In addition, traditional clean-up methods are often economically prohibitive due to the low concentrations of the contaminants. In contrast, biodegradation processes can convert toxic pollutants to non-toxic products such as carbon dioxide and water and are generally more economical than traditional clean up methods at low contaminant concentrations.

In industrial operations, tightening regulations are requiring more stringent controls on emissions and disposal, and chemical hygiene requirements are forcing the use of higher air volumes to provide worker safety, which results in high-volume, low-concentration contaminated air streams. Such contaminated air streams may be diluted to the point that traditional technologies, such as wet scrubbing, thermal oxidation, air stripping, or carbon adsorption may be either ineffective or too costly. Such dilute applications are well suited to biodegradation processes, which utilize microorganisms attached to natural or synthetic packing to actually biodegrade the target pollutants to non-toxic products rather than simply transfer them from one medium to another. Using biodegradation processes, contaminated streams are passed through packing containing microorganisms which degrade or mineralize the pollutants into harmless compounds such as carbon dioxide, salts, and water. In many cases, biodegradation processes provide cost-effective, environmentally friendly alternatives to traditional pollution control or remediation technologies.

The fate of chlorinated hydrocarbons, particularly TCE, is a major concern of the Department of Defense (DoD). Numerous DoD sites in the U.S. have been identified as having groundwater contaminated with chlorinated hydrocarbons as well as other hazardous organic compounds. The Army has prioritized "Solvents in Groundwater" as the fifth highest requirement in the area of environmental cleanup research and development. At some DoD sites, contaminated groundwater is pumped to air strippers which remove the contaminants from the groundwater and transfer them to an air stream. In many cases, these contaminated air streams from the strippers are simply released to the environment. In addition, painting, coating, paint stripping, solvent degreasing, and other operations at DoD sites result in the release of streams contaminated with TCE, methylene chloride, and other harmful VOCs (volatile organic compounds) and SVOCs (semi-volatile organic compounds) to the environment. Economical and practical processes are needed to degrade such contaminants to harmless by-products, either directly in groundwater or wastewater, or in the air streams emitted to the environment from air stripping operations, from soil vapor extraction processes, or from other operations which release harmful pollutants.

Traditional contaminated groundwater clean-up methods include air-stripping and/or granulated-activated carbon (GAC) adsorption. Generally, the contaminated groundwater is pumped to the surface and then to the top of an air stripper, which usually consists of a cylindrical column packed with material designed to maximize liquid-to-air contact. The contaminated water flows down through the packing by gravity as air is blown up through the column. The volatile organic compounds are thus counter-currently stripped from the water and enter the air during transit through the stripper. In some cases, this contaminated air stream is then blown through an activated carbon filter designed for removal of the particular contaminants in question. However, the contaminants are not destroyed. They are simply held and concentrated within the carbon filter. At some point in time the carbon filter becomes saturated with contaminants, and then the contaminants begin to pass through the filter to the environment. At this time, it is necessary to replace the contaminated carbon with fresh carbon and to either dispose of the contaminated carbon or to send it to a vendor for regeneration, both of which are costly and inconvenient operations. In some cases, the groundwater may be pumped directly through carbon filters without first air stripping. In other cases, the groundwater is air stripped, the air from the air strippers is emitted to the environment, and the water effluents from the air strippers are passed through carbon filters to remove less volatile compounds which may not be removed by the strippers. Unlike carbon adsorption, biodegradation processes such as biofiltration can destroy the contaminants and offer practical, cost-effective, and environmentally friendly alternatives.

Biofiltration technology is being developed as an economical and environmentally friendly solution for a variety of remediation and pollution control applications. Example applications include both point and non-point source industrial emissions (regulated by the 1990 Amendments to the Clean Air Act) as well as site remediation waste streams generated by soil vapor extraction and air sparging systems. Biofiltration technology has been accepted in Europe for the last 50 years for the control of odors. Within the last decade, the technology is gradually being adopted in the U.S., and the application base is broadening to include the control of volatile organic compounds.

In most biodegradation processes, the microorganisms actually consume and derive food value from the target pollutants, and the waste stream can be passed continuously through the processes to achieve continuous degradation of the target pollutants in the waste stream. In other words, the microorganisms directly metabolize the pollutants as a source of food and growth. Such biodegradation processes will hereinafter be referred to as direct-metabolism processes. Pollutants capable of being directly consumed (or metabolized) by microorganisms in biodegradation processes include methyl ethyl ketone, methyl isobutyl ketone, butyl acetate, toluene, xylene, styrene, benzene, carbon disulfide, hydrogen sulfide, ammonia, and many others.

However, with certain pollutants, such as chlorinated aliphatic hydrocarbons and in particular the chloroethylenes, naturally occurring microorganisms cannot directly consume and derive food value from the pollutants. In other words, the microorganisms cannot directly metabolize the pollutants. In such cases, certain alternate carbon (food) sources, or primary substrates, can be supplied that the microorganisms directly metabolize, and in so doing, the microorganisms thereby generate enzymes capable of degrading certain target pollutants that cannot be directly metabolized. In other words, the pollutants targeted for destruction are indirectly degraded by enzymes generated when the microorganisms directly metabolize another compound in a process known as cometabolism. Hereinafter, such biodegradation processes shall be referred to as cometabolism processes. The alternate or primary food sources that the microorganisms directly metabolize can themselves also be pollutants or undesirable compounds such as toluene, or they can be relatively innocuous compounds such as glucose or propane.

Pollutants amenable to aerobic biodegradation via direct metabolism are those in which a wide variety of naturally occurring microorganisms can consume directly as sources of food, whereas pollutants requiring cometabolism for aerobic biodegradation are those in which the naturally occurring cannot consume directly as sources of food. Pollutants amenable to biodegradation via direct metabolism include a wide variety of organic compounds including alcohols, esters, ethers, ketones, aromatics, and alkanes, such as ethanol, butyl acetate, methyl tertiary butyl ether, methyl ethyl ketone, toluene, and propane, resectively, and other organic or non-organic compounds that may or may not contain halogens, sulfur, or nitrogen, such as methylene chloride, carbon disulfide, hydrogen sulfide, or ammonia. Pollutants requiring cometabolism for degradation include certain halogenated organic compounds, especially the chloroethylenes, such as tetrachloroethylene, trichloroethylene, dichloroethylenes, and vinyl chloride.

As will easily be appreciated by one skilled in the art, a direct metabolism process in accordance with the present invention is essentially a cometabolism process in accordance with the present invention except that the target contaminant cometabolic degradation step is omitted and only the direct metabolic metabolism step exists.

Obviously it is impossible to list all pollutants amenable to aerobic biodegradation via direct metabolism and those pollutants amenable to aerobic biodegradation via cometabolism. In fact, quite often there is no strict line of distinction between these two classes of pollutants, and some are amenable to aerobic biodegradation both direct metabolism and via cometabolism. Since direct metabolism is a simpler process, if a pollutant is amenable to aerobic biodegradation via simple direct metabolism, then direct metabolism will generally be the process of choice. On the other hand, if a pollutant is amenable to aerobic biodegradation via direct metabolism but the process is inefficient, then, generally speaking, aerobic biodegradation via cometabolism will be the process of choice.

Cometabolism processes are complicated by the fact that the target pollutants are not efficiently destroyed when the primary food sources are also present because the primary food sources compete with degradation of the target pollutants. In other words, when both the target pollutants and the primary food sources are present together, the microorganisms' consumption (or direct metabolism) of the primary food sources greatly reduces degradation of the target pollutant through competitive inhibition. However, the degradation efficiency of the target pollutants can be improved by periodically withholding the primary food sources to allow the enzymes generated by direct metabolism of the primary food sources to degrade the target pollutants in the absence of the primary food source, thereby eliminating the deleterious effects of competitive inhibition.

TCE and other chlorinated aliphatic compounds can be cometabolically degraded by aerobic microorganisms if a primary carbon and energy source is available. Wilson and Wilson, 1985, first demonstrated aerobic degradation of TCE by soil samples amended with methane gas. Propane (Fliermans et al. 1988; Wackett et al. 1989), ammonia (Arciero et al. 1989), phenol (Hopkins et al. 1993), and toluene (Nelson et al. 1987) oxidizing microorganisms have also been reported to degrade TCE. Remediation systems containing methane-oxidizing bacteria, methanotrophs, have shown notable promise and have been extensively studied for the removal of TCE from contaminated streams. Methanotrophic isolate and mixed-culture systems have been studied in detail on the microcosm scale for determination of the optimum degradation environment and for degradation pathway determination (Brusseau et al. 1990; Fox et al. 1990; Little et al. 1988; Oldenhuis et al. 1989; Tsien et al. 1989). Furthermore, reactor experiments have been conducted (Fennell et al. 1993; Strandberg et al. 1989; Tschantz et al. 1995; Alvarez-Cohen and McCarty, 1991), and several studies have been reported where aquifer conditions were simulated in which methanotrophic organisms under proper stimulation degraded TCE (Semprini et al. 1990; Semprini et al. 1991; Wilson and Wilson, 1985). Methanotrophic systems continue to be investigated due to evidence that suggests that under the proper operating conditions, these methane-oxidizing microorganisms often degrade TCE at faster rates than other TCE degraders (Fennell et al. 1993; Chang and Alvarez-Cohen, 1995). Propane has been shown to stimulate TCE degradation (Phelps et al., 1991), and greater degradation efficiencies have been observed by manipulating or pulsing the primary substrate (Lackey, et. al. 1993). The teachings of the publications in this paragraph with regard to microorganism types and primary substrate types are hereby incorporated by reference and are discussed later in more detail, infra.

Several patents have been issued which teach microorganisms or methods for biodegradation of chlorinated compounds, some of which employ primary substrates (or primary food sources) to induce degradation of the target pollutants, including U.S. Pat. Nos. 4,452,894; 4,477,570; 4,664,805; 4,713,343; 4,749,491; 4,853,334; 4,859,594; 4,925,802; and 4,954,258; 5,079,166; and 5,543,317. The teachings of these patents with regard to microorganism types and primary substrate types are hereby incorporated by reference.

U.S. Pat. No. 4,452,894 teaches a microorganism composition capable of utilizing various halogenated aromatic compounds as sole sources of carbon without the need for primary substrate inducers, but it does not teach or claim said utilization of chlorinated aliphatic compounds, such as chloroethylenes, as sole carbon sources.

U.S. Pat. No. 4,477,570 teaches microorganism strains which degrade aromatic and halogenated aromatic compounds without primary substrates, but it makes no claim of degradation of chlorinated aliphatic hydrocarbons.

U.S. Pat. No. 4,664,805 teaches bacteria strains and in situ methods for accelerating the degradation of various halogenated organic pollutants, particularly polyhalogenated biphenyls, by addition of non-indigenous microorganisms and chemical analogs to contaminated environments. Careful balance of concentrations of the non-indigenous microorganisms, the indigenous microorganisms, and the chemical analog; competition between the indigenous and the non-indigenous microorganisms; and competition between the chemical analog and the halogenated metabolic by-products for degradation by the indigenous microorganisms diminish the practicality and economic viability of this method, as demonstrated by the low contaminant degradation rates obtained and long contact times required.

U.S. Pat. No. 4,713,343 teaches in situ methods for aerobically degrading halogenated aliphatic hydrocarbons in contaminated water by treating the water with microorganisms, alkane gases, and oxygen sources. The alkane gases are added to the contaminated water as carbon sources (primary food sources) to induce degradation of the target pollutants through an enzymatic pathway. The alkane gas inducers are thus co-mingled with the target contaminants of the environment, resulting in competition between the inducer and the target contaminants for degradation by the microorganisms. As prior art teaches, such co-mingling and competition between the inducer (primary food source) and target contaminants renders such methods cost prohibitive due to the low target contaminant degradation rates resulting from competitive inhibition of target contaminant degradation by degradation of the inducer. The low target contaminant degradation rates obtained using the methods taught in this patent are demonstrated by the long contact times required to achieve degradation of the target contaminants.

U.S. Pat. No. 4,749,491 teaches an in situ method for stimulating indigenous bacteria to degrade chlorinated hydrocarbons in water and soil through the addition of nutrients and oxygen sources such as hydrogen peroxide without the use of inducers such as propane or methane. Control of concentrations of the nutrients must be maintained such that overgrowth of microorganisms does not cause plugging of the substrata. In the teachings of this patent, no record or proof is demonstrated of the degradation of the subject contaminants by the subject indigenous microorganisms. Rather, claim is made to the relative degree of growth of unidentified microorganisms under aerobic laboratory conditions in the presence of said contaminants, said nutrients, and air or hydrogen peroxide. This said relative degree of growth is determined by subjective visual inspection of the relative degree of turbidity of the laboratory samples without identification of the microorganism species or any determination of its ability to degrade the subject contaminants.

U.S. Pat. No. 4,853,334 teaches a process using *Pseudomonas fluorescens* microorganisms to degrade haloaliphatic hydrocarbons, with or without carbon sources such as glucose or molasses as primary substrates to stimulate the bacteria to degrade the subject contaminants. However, the low degradation rates obtained and long contact times required are cost prohibitive and impractical for commercial applications. For example, only 2% of TCE present was degraded in 24 hours and only 13% of TCE present was degraded in 5 days.

U.S. Pat. No. 4,859,594 teaches microorganism strains and methods for genetically modifying, immobilizing, and utilizing said strains for degrading chloroethanes, chlorophenols, and PCPs without the use of primary substrates to induce degradation of the subject contaminants. However, the teachings make no provision or claim of degradation of chloroethylenes such as TCE. Furthermore, the genetically modified microorganisms are subject to competition by other microorganisms which may develop, thrive, and dominate when the subject biodegradation media are subjected to contaminants in the environment either incidentally or by choice other than those on which the said genetically modified organisms are adapted to dominate and thrive. Such competition and domination of alternate organisms which thrive on other contaminants can result in loss of capacity or function of genetically modified biodegradation media to degrade the contaminants they were adapted to degrade and intended to degrade.

U.S. Pat. No. 4,925,802 teaches a method for biodegradation of halogenated aliphatic hydrocarbons such as TCE by the addition of an aromatic amino acid primary substrate, in particular tryptophan, to induce degradation of the subject contaminants through activation of an oxygenase enzymatic pathway. An alternate method involves a preliminary step in which the microorganisms are first stimulated with the primary substrate to induce activation of the enzymes capable of degrading the subject contaminants followed by addition of the said stimulated microorganisms to the environment containing the subject contaminants, with or without additional inducer. However, with this method, presence of the inducer is required to sustain microbial production of the contaminant-degrading enzymes, and when the enzymes produced during the said preliminary stimulation step have been exhausted in the contaminated environment through degrading the subject contaminants, additional inducer or additional pre-stimulated microorganisms would be required to be added to the contaminated environment. Adding additional inducer to the contaminated environment introduces the competitive inhibition problems which exist with co-mingling of the inducer with the target contaminant. Adding additional pre-stimulated microorganisms to the environment would require a dedicated process for production of pre-stimulated microorganisms for repeated additions to the contaminated environment until such time that satisfactory decontamination was accomplished, thus substantially increasing remediation costs. In addition, the said dedicated process for production of pre-stimulated microorganisms would be required to be capable of completely consuming the said inducer prior to introduction of the said pre-stimulated microorganisms to the contaminated environment or the residual inducer would be introduced as well into the environment, thus co-mingling the inducer with the subject contaminants and thus reducing the efficiency and economic viability of the process.

U.S. Pat. No. 4,954,258 teaches improvements in prior art methods for alkane-induced, methanotrophic bacterial degradation of halogenated aliphatic hydrocarbons in water (as in U.S. Pat. No. 4,713,343, Wilson et al.) by substituting part or all of the alkane inducers with lower alkanols, in particular methanol. The subject patent teaches that the substituted alkanols provide an alternate carbon source for growth of the methanotrophic bacteria and that the alkanols do not substantially bind with methane monooxygenase, the enzyme required for degradation of the halogenated aliphatic hydrocarbons, and thus the alkanols do not competitively inhibit degradation of the subject contaminants in the way that alkanes do by competing for the methane monooxygenase. Rather, the alkanols are metabolized by methanol dehydrogenase. However, methane monooxygenase is required for degradation of the halogenated aliphatic microorganisms. Therefore, when the methane monooxygenase supply is exhausted through degradation of the halogenated aliphatic hydrocarbons, methane or other stimulus must be added to the system to stimulate production of additional methane monooxygenase if degradation of halogenated hydrocarbons is to continue. The substituted methanol provides a carbon source for growth of the methanotrophic bacteria but does not activate the methane monooxygenase enzyme required for the intended degradation of the halogenated aliphatic hydrocarbons. Thus, to continue degradation of the subject contaminants, adding additional methane or other methane monooxygenase inducing stimuli to the contaminated environment or biodegradation media is required until such time that the environment or contaminated media is satisfactorily decontaminated, which allows co-mingling of the methane monooxygenase inducer with the subject contaminants and the associated competitive inhibition problems which substantially reduce efficiency and economic viability. The low degradation rates demonstrated with use of the above taught method are cost prohibitive and preclude its economical use in commercial applications.

U.S. Pat. No. 5,079,166 teaches a method for degradation of TCE by treating TCE with genetically engineered and isolated microorganisms containing a recombinant plasmid which contains toluene monooxygenase genes. The microorganisms of the subject patent must have been treated with an inducer of the toluene monooxygenase genes. This method avoids the complications of competitive inhibition associated with co-mingling of the inducer with the contaminant, but the genetically engineered microorganisms are not capable of sustaining degradation of TCE on their own in the contaminated environment or degradation media. New genetically engineered microorganisms must be continually grown in a separate controlled environment and continually added to the contaminated environment until such time that decontamination is complete, or they must be continually added to a continuous ex situ bioreactor process to sustain the degradation capacity of such bioreactor until such time that operation of the bioreactor is no longer needed or desired. Furthermore, the low degradation rates and long contact times demonstrated by the methods of this invention as well as the requirement for repeated separate-environment growth and addition of the genetically engineered microorganisms render the method cost prohibitive for commercial operations, particularly for the case of ex situ bioreactor processes, requiring a period of hours for substantial degradation TCE.

U.S. Pat. No. 5,543,317 teaches a bacterium capable of degrading hazardous chemicals, including chloroethylenes and TCE, without the use of a primary substrate to induce degradation of the subject contaminants. However, the said microorganisms are genetically engineered microorganisms, and therein exists several aforementioned disadvantages with use of such organisms in natural environments. Such disadvantages can include additional processing costs, process complications, and process inefficiencies for the genetically engineered methods as described above concerning U.S. Pat. No. 5,079,166. Genetically engineered pure microorganism cultures generally are not capable of sustaining their populations and thus their degradation efficiencies in the diverse contaminated environments encountered in nature and therefore must be continually or periodically replenished due to competing bacteria as well as competing substrates and contaminants. The low degradation rates (1.3 mg TCE/L/day) and long contact times (overnight incubation) demonstrated in this patent (U.S. Pat. No. 5,543,317, supra) as well as the need for repeated separate controlled environment growth and addition of the genetically engineered microorganisms render the method cost prohibitive for commercial operations, particularly for the case of ex situ bioreactor processes, requiring an overnight period for substantial degradation of TCE.

Prior art teaches that ex situ biofilters and bioreactors are akin to microorganism zoos, with the microorganism cultures naturally adapting, dominating, and maintaining themselves according the various compounds, food sources, and contaminants present or fed to the biodegradation media. Biofilters and bioreactors can be inoculated with pure microorganism cultures, genetically engineered microorganism cultures, mixtures of various cultures, groundwater, soil sediments, or sewage sludge, but the inoculated cultures generally do not sustain themselves in their original inoculated type and makeup in the biodegradation media with the myriad of other indigenous microbes, substrates, and contaminants being fed to a biofilter or bioreactor from sources open to the atmosphere and elements. There occurs adaptations and changes within the microbial populations in the biodegradation media to those cultures which best survive and thrive on what is available in the natural environment or waste stream to be remediated or otherwise purified of contaminants. Such natural environments generally include a myriad of indigenous microorganisms, contaminants, food sources, and compounds other than those present in external controlled environments manipulated to cause domination and purification of specific cultures for degrading the compounds in the natural environment targeted for detoxification. When such pure cultures are subjected to such natural environments, either in situ or ex situ, changes in the microbial populations generally occur to favor those organisms which best thrive in the natural environments or in the bioreactor which is receiving the contaminated stream from a natural environment or other operation exposed to the natural environment.

Indeed, there is no need for initial inoculation of biofilters or at all, since a myriad of naturally occurring microorganisms is present everywhere in the environment, and the waste streams containing the target contaminants fed to the ex situ biofilters or bioreactors from the natural environment already contain diverse wild type microorganisms that have adapted to sustain themselves in the presence of the target contaminants, similarly to the way in which wild yeasts in the environment degrade sugars present in fruit into alcohol. The biofilters or bioreactors function to immobilize, feed, and concentrate the microorganism cultures which best degrade the target contaminants. Thus, when biofilter or bioreactor operations are initiated without an initial inoculum, the diverse wild type microorganisms present in the surrounding environment and in the waste streams containing the target contaminants enter the biofilters or bioreactors and adapt, change, grow, and dominate to those cultures which best survive and thrive on the contaminated streams, food sources, and nutrients present or passing through the biofilters or bioreactors. Pre-isolation and concentration of microorganism cultures for initially inoculating biofilters or bioreactors may reduce start up time but is not necessary, since changes, adaptations, and dominance of certain cultures will occur even in such isolated and inoculated cultures after operation begins and the biofilters or bioreactors are subjected to complex mixtures of food sources, contaminants, and microorganisms present in the natural environment.

There appears no prior art in which the Applicants are aware of the ex situ cometabolic or direct metabolic processes of our invention utilizing our novel closed-loop recycle schemes that (1) provide efficient and complete direct metabolism of primary substrates (food sources), whether they themselves be pollutants or harmless compounds, without loss or venting of the primary substrates to the environment, (2) allow enzymatic degradation (cometabolism) of sorbed or residual target contaminants during feeding of the primary substrates to the microorganisms without loss or venting of the primary substrates or target contaminants to the environment, (3) virtually preclude co-mingling of primary substrates with target contaminants and thereby achieve high target contaminant degradation efficiency, (4) utilize naturally occurring microorganisms widely available in the environment, and (5) self-optimize to maintain the optimal microbial types and populations without the need for microorganism replenishment or modification.

SUMMARY OF THE INVENTION

The present invention relates to novel, efficient, and economical ex situ processes utilizing closed-loop recycle schemes for cometabolic degradation of chloroethylenes or other amenable target contaminants which alone are not easily or efficiently degraded by naturally occurring microorganisms and for direct metabolic degradation of a wide variety of other amenable contaminants. The processes of the present invention are not limited to utilization of any particular type of microorganism and preferably utilize naturally occurring microorganisms which are widely available in the surrounding environment and that are easily obtainable from sources such as soil sediments, groundwater, or in the contaminated streams to be treated and that are widely taught in the prior art, supra. Examples of such naturally occurring microorganisms which may be utilized in the processes of the present invention include those discussed in the prior art previously incorporated by reference.

The processes of the present invention for cometabolic degradation utilize primary substrates (alternate food sources) to induce enzymatic degradation (cometabolism) of target pollutants which alone are not easily or efficiently biodegraded by such naturally occurring microorganisms, such as is the case with chloroethylenes, particularly TCE. Further, the processes of the present invention for cometabolic degradation are operated in a cyclical fashion such that feeding of the targeted waste or contaminated streams is separated from feeding of the primary substrate streams into separate and discrete process cycles to minimize or eliminate co-mingling of the primary substrate with the target contaminants. Most importantly, the processes of the present invention utilize novel closed-loop recycle schemes which dramatically improve the efficiency, economics, and practicability of such. During closed-loop recycle periods, the processes are virtually closed to the outside environment with little or no net process flows entering or leaving the processes. These novel closed-loop recycle schemes can be employed for direct metabolism of food sources, whether they be pollutants, undesirable compounds, or innocuous compounds, and/or for cometabolism of target contaminants incapable of direct metabolism. For contaminants requiring degradation by cometabolism, the novel closed-loop recycle schemes can be employed not only during the microorganism feeding periods (direct metabolism), but during the target contaminant degradation periods (cometabolism) as well. In addition, these novel closed-loop recycle schemes can be employed for high-efficiency destruction of a wide variety of pollutants and undesirable compounds that are capable of microbial degradation by direct metabolism in a simplified process without a cometabolic degradation cycle. In such simplified direct metabolism processes, the food sources for the microorganisms are the pollutants targeted for destruction and the processes are closed to outside environment except for short periods to replenish microorganisms in the closed system with fresh air. The novel closed loop recycle schemes of the present invention may be used for treating either gas- or liquid-phase streams containing contaminants capable of direct metabolism and/or contaminants requiring cometabolism. The processes may be applied on a batch or continuous basis to contaminated soil and groundwater, to contaminated effluents from a wide variety industrial operations such as solvent degreasing, or to wherever amenable contaminants are present.

Chloroethylenes, particularly TCE, are known to be difficult to biodegrade aerobically to non-toxic products without the employment of a primary substrate to feed the microorganisms and thereby induce cometabolic degradation of the chloroethylenes through an enzymatic pathway. Ordinarily, practical and economical enzymatic degradation of chloroethylenes via a primary substrate is not possible because direct metabolism (consumption) of the primary substrate itself competes with enzymatic cometabolic degradation of the target pollutants, thus rendering degradation of the target pollutant inefficient and economically prohibitive. In the processes of the present invention for cometabolic degradation, pulsing the primary substrate stream with the contaminated stream, or in other words, alternating flow of the primary substrate with flow of the contaminated stream to be detoxified in a cyclic fashion, improves economic viability over processes which allow simultaneous presence of both the primary substrate and the target contaminants in the packing or other biodegradation media. However, in practice, a substantial quantity of chloroethylenes or other amenable contaminants sorb to the biodegradation media during flow of the contaminated stream, and when the primary substrate stream is again returned to the process to sustain the microorganisms and generate enzymes needed for target contaminant degradation, presence of the primary substrate causes the residual and sorbed target contaminants to desorb from the biodegradation media and escape to the environment, resulting in a substantial loss of process efficiency and economics. Furthermore, practical contact times required for economical commercial operation dictate the incomplete utilization (direct metabolism) of the primary substrate during single-pass and/or open-loop process flow, and its co-mingling with the target contaminants when they are again returned to the system results in competitive inhibition of target contaminant degradation, allowing the target contaminants to pass through the process undegraded and further decreasing process efficiency and increasing process cost.

We have unexpectedly found that, for cometabolic processes, practicing the processes of the present invention utilizing novel closed-loop recycle operation schemes take advantage of the adsorption-desorption dynamics within the biodegradation media and unexpectedly (1) provide efficient and complete direct metabolism of primary substrates (food sources), whether they themselves be pollutants or harmless compounds, without loss or venting of the primary substrates to the environment, (2) allow enzymatic degradation (cometabolism) of sorbed or residual target contaminants during feeding of the primary substrates to the microorganisms without loss or venting of the primary substrates or target contaminants to the environment, (3) virtually preclude co-mingling of primary substrates with target contaminants and thereby achieve high target contaminant degradation efficiency, (4) utilize naturally occurring microorganisms widely available in the environment, and (5) self-optimize to maintain the optimal microbial types and populations without the need for microorganism replenishment or modification, thus dramatically improving the simplicity, economics, and practicability of such processes.

Scientific wisdom indicates that said closed-loop recycle schemes should deplete the oxygen supply in the closed system, resulting in loss of the aerobic microorganisms and failure of the process. However, the novel closed-loop recycle schemes of the present invention unexpectedly result in dramatic improvements in process efficiency and economics while self-optimizing the microbial types and populations to the chosen primary substrate(s) (in cometabolic processes) and the site-specific target pollutants and other environmental characteristics.

With use of the novel closed-loop recycle schemes of the present invention for cometabolic or direct metabolic processes, oxygen demand for the primary substrate and/or pollutant should deplete the oxygen supply, kill the aerobic microorganisms, and render the process useless. Unexpectedly, oxygen levels are reduced only slightly, defying conventional scientific wisdom concerning the function of the aerobic microorganisms. The closed loop recycle schemes dramatically reduce use (cost) of the primary substrate, eliminate target pollutant emissions during feeding of the microorganisms, and reduce overall pollutant emissions, which in turn dramatically improves process efficiency and reduces process capital and operating costs.

We have also unexpectedly found that, for pollutants capable of biodegradation via direct metabolism only, practicing the processes of the present invention utilizing novel closed-loop recycle operation schemes take advantage of the adsorption-desorption dynamics within the process and unexpectedly (1) provide efficient and complete direct metabolism of the contaminants without loss or venting of the contaminants to the environment, (2) utilize naturally occurring microorganisms widely available in the environment, and (3) self-optimize to maintain the optimal microbial types and populations without the need for microorganism replenishment or modification, thus dramatically improving the simplicity, economics, and practicability of such processes.

It is therefore the principal object of the present invention to provide novel, efficient, and economical ex situ processes utilizing closed-loop recycle schemes for cometabolic enzymatic degradation of chloroethylenes and other amenable contaminants which alone are not easily or efficiently degraded by naturally occurring microorganisms and for direct metabolic degradation of a wide variety of other amenable contaminants.

Another object of the present invention is to provide said cometabolic processes such that flow of the waste or contaminated streams is substantially separated from flow of the primary substrate streams into separate and discrete process cycles to minimize or eliminate co-mingling of the primary substrate with the target contaminants to avoid loss of contaminant degradation efficiency.

A further object of the present invention is to provide said processes with microbially self-optimizing characteristics which force the adaptation, dominance, and maintenance of the microbial types and populations that provide optimal degradation of the target contaminants, without the need for addition or replenishment with pure, externally grown strains of microorganisms, and rather, allowing no initial inoculation or the initial inoculation of the processes with the waste stream to be detoxified or with soil sediments or water collected from widespread environments which are contaminated with the target contaminants or other site-specific amenable contaminants targeted for detoxification.

A still further object of the present invention is to provide said cometabolic processes with novel closed-loop recycle schemes in which the processes are periodically closed the outside environment and the enclosed process streams are recirculated within the process which (1) provide efficient and complete direct metabolism of primary substrates (food sources), whether they themselves be pollutants or harmless compounds, without loss or venting of the primary substrates to the environment, (2) allow enzymatic degradation (cometabolism) of sorbed or residual target contaminants during feeding of the primary substrates to the microorganisms without loss or venting of the primary substrates or target contaminants to the environment, (3) virtually preclude co-mingling of primary substrates with target contaminants and thereby achieve high target contaminant degradation efficiency, (4) utilize naturally occurring microorganisms widely available in the environment, and (5) self-optimize to maintain the optimal microbial types and populations without the need for microorganism replenishment or modification, thus dramatically improving the simplicity, economics, and practicability of such processes.

A still further object of the present invention is to provide said direct metabolic processes with novel closed-loop recycle schemes in which the processes are periodically closed the outside environment and the enclosed process streams are recirculated within the process which (1) provide efficient and complete direct metabolism of the contaminants without loss or venting of the contaminants to the environment, (2) utilize naturally occurring microorganisms widely available in the environment, and (3) self-optimize to maintain the optimal microbial types and populations without the need for microorganism replenishment or modification, thus dramatically improving the simplicity, economics, and practicability of such processes.

Still further and more general objects and advantages of the present invention will appear from the more detailed description set forth below, it being understood, however, that this more detailed description is given by way of illustration and explanation only and not necessarily by way of limitation, since various changes therein may be made by those skilled in the art without departing from the true scope and spirit of the instant invention.

DESCRIPTION OF THE DRAWINGS

The present invention, together with further objects and advantages thereof, will be better understood from a consideration of the following description taken in connection with the accompanying drawings and examples in which:

FIGS. 2–8 pertain to the EXAMPLES, infra, where they are discussed in detail.

FIG. 1 is a flow sheet generally illustrating the principles of our new and novel processes for the simple, effective, and economical cometabolic degradation of chloroethylenes and other amenable, site-specific target contaminants. Although the description and examples which follow are conveniently directed to a continuous operation for detoxifying a gaseous stream contaminated with TCE and dichloroethylene (DCE) and utilizing propane as the primary substrate, those skilled in the art will readily appreciate that only simple modifications and adjustments are necessary to practice the processes of the instant invention (1) on a continuous, recycle operation basis, (2) on a batch operation basis, (3) on a batch, recycle operation basis, (3) for detoxifying streams contaminated with other compounds amenable to cometabolic degradation through use of primary substrates, (4) for detoxifying contaminated liquid streams, (5) with primary substrates other than propane, (6) for detoxifying streams contaminated with a wide variety of compounds capable of direct metabolism by naturally occurring microorganisms and not requiring a cometabolism step, and/or (7) using various combinations of process variations (1) through (6).

As will easily be appreciated by one skilled in the art, a direct metabolism process in accordance with the present invention is essentially a cometabolism process in accordance with the present invention except that the target contaminant cometabolic degradation step is omitted and only the direct metabolic metabolism step exists.

Figure 1:
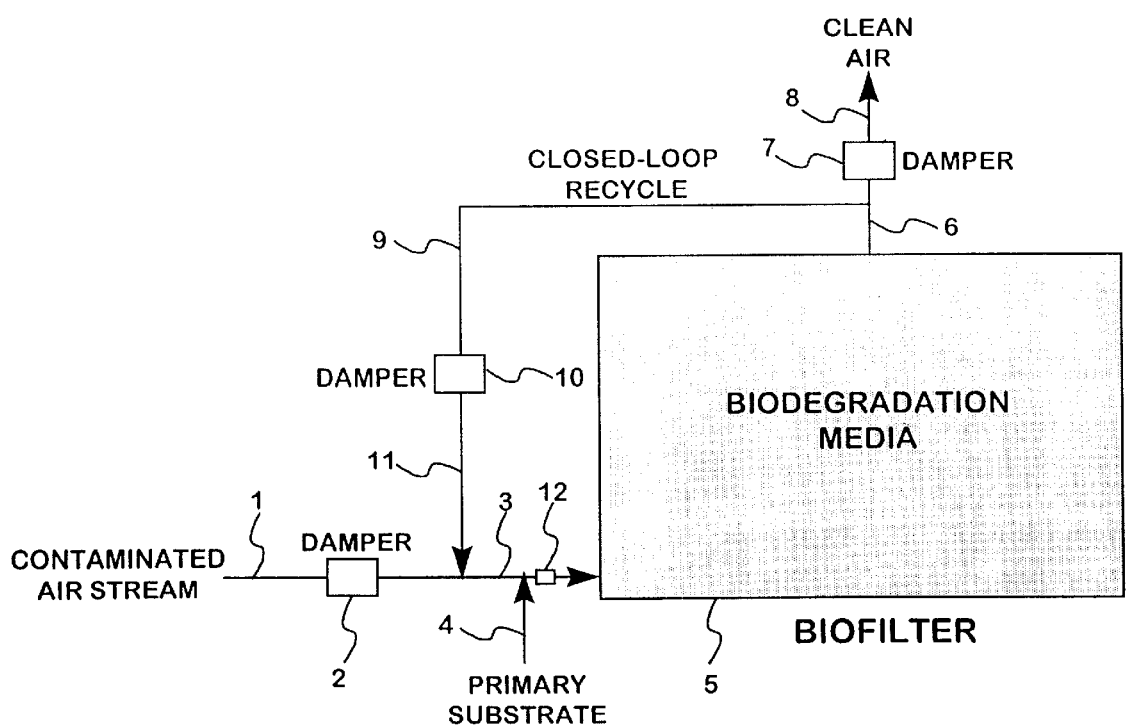
FIG. 1 is a flow sheet generally illustrating the cometabolic and/or direct metabolic processes of the present invention.

Referring now more specifically to FIG. 1 which illustrates one example process of the instant invention, the process operates in two separate and discrete cycles, the target contaminant cometabolic degradation cycle and the primary substrate direct metabolism cycle, supra, one alternating with the other. The influent, effluent, and internal process flows are controlled to specific values with respect to on or off mode, flow rate, concentration, and/or other pertinent parameters necessary to effect the required performance characteristics of the process for the specific waste stream being decontaminated. These process parameters are automatically controlled by means of timers, controllers, control valves, control dampers, flammable gas sensors and controllers, and other various control equipment. For the present case of decontaminating a gas-phase contaminated waste stream, electronically controlled dampers and control valves automatically direct process flows in the proper directions and at the proper rates when the appropriate time has been reached to end one cycle and begin another cycle or when the appropriate time has been reached within a specific cycle to change pertinent process parameters such as primary substrate rate or closed-loop recycle flow rate.

Referring again to FIG. 1 for the example of open-loop, single-pass operation during the contaminant cometabolic degradation cycle, supra, a contaminated air stream flows from a source not shown through line 1, and on through damper 2, which for said process cycle is set in the open position to allow flow. The contaminated air stream from damper 2 then flows through line 3 to biofilter 5, (traditionally termed "bioreactor" for liquid-phase decontamination applications) where the contaminated air stream passes through the biodegradation media, and the contaminants are degraded to non-toxic compounds by way of enzymes produced by the microorganisms during a prior primary substrate direct metabolism feeding cycle. The biodegradation media can consist of a wide variety of natural packings, such as composts, or synthetic packings, such as pall rings or activated carbon, with the microorganisms immobilized and growing in and on the said packing. In some cases, moisture is provided to the packing if the gaseous contaminated stream does not provide sufficient moisture for the viability of the microorganisms. The now-detoxified clean air exits the biofilter through line 6 and passes on through damper 7, which is set in the open position. The clean air does not flow into line 9 because damper 10 has been automatically set in the closed position. The clean air from damper 7 then flows on through line 8 to exit the process to the atmosphere.

Referring again to FIG. 1 for closed-loop recycle operation during the primary substrate feeding cycle, damper 2 is automatically set in the closed position at the beginning of said cycle to stop flow of the influent contaminated air stream through line 3. The gas in line 3 is fed by a blower or fan not shown through line 3 and on to biofilter 5. At the appropriate time during the cycle and at the appropriate rates and intervals, primary substrate, preferably propane in this example application, is fed through line 4 from a propane tank not shown with its rate controlled by an automatic control valve as well as timers to provide intermittent flow. The primary substrate leaving line 4 enters line 3 and mixes with the recirculating air in line 3, supra, and the resulting air-primary substrate mixture continues on through line 3 and enters LEL sensor 12, which is connected to a control valve not shown which controls flow of the primary substrate absolutely precluding any flammable gas mixtures from being produced and absolutely precluding any flammable gas mixtures from existing anywhere in the process or outside the process. (Two other redundant control loop safeguards were used in the example of the present invention which involved automatic cessation of propane flow when air rate fell below certain levels and automatic cessation of propane flow with failure of the air blower). The nonflammable air-primary substrate mixture then continues to flow through line 3 and on to biofilter 5 where the primary substrate and air stream pass through the biodegradation media and the primary substrate is directly metabolized to provide growth of the microorganisms and the necessary enzymes are produced for cometabolic degradation of the target contaminants. During passage of the air-primary substrate mixture through the biofilter, any residual target contaminants left in the internal air of the now-closed process at the beginning of the cycle, as well as any target contaminants adsorbed in the biodegradation media during the contaminant cometabolic degradation cycle, in this example TCE and DCE, are also cometabolically degraded, albeit with less efficiency than during the separate contaminant cometabolic degradation cycle, but without the release of the target contaminants from the process that would occur with single-pass open-loop operation during the primary substrate feeding cycle. The internal process gas leaves biofilter 5 through line 6 and enters line 9, the closed-loop recycle line, because damper 7 has automatically been set in the closed position at the beginning of the primary substrate feeding cycle. The internal process gas continues through line 9 and on through damper 10 which is now set in the open position. The internal process gas flows from damper 10 through line 11 and then on through line 3 again. The internal process gas does not flow through line 1 because damper 2 is in the closed position. The internal process gas is recirculated through line 3, primary substrate enters line 3 through line 4, the internal process gas and primary substrate mix and flow on through LEL sensor 12 and on to biofilter 5 and this closed-loop recirculation flow is repeated until the prescribed time for the primary substrate direct metabolic feeding cycle to end and the next contaminant cometabolic degradation cycle to begin, said prescribed time as well as other process parameters of the primary substrate feeding cycle being preset and controlled to achieve the required process efficiency performance as a to function of the characteristics of the specific waste streams being decontaminated.

For cometabolic detoxification of liquid streams, the contaminated liquid is preferably trickled or sprayed down through the biodegradation media in the bioreactor during the contaminant cometabolic degradation cycle. Clean air is passed through the bioreactor at rates only high enough to provide sufficient air to sustain the aerobic microorganism and allow cometabolic enzymatic degradation of the target contaminants so as to minimize loss of target contaminants to the environment through vaporization of the contaminants from the liquid stream into the air. Preferably, during the contaminant cometabolic degradation cycle with liquid-phase waste streams, the bioreactor air is recirculated in closed loop fashion, the bioreactor is completely closed to the outside environment to preclude any vapor release of the target contaminants, and the bioreactor is purged with fresh air for short duration only as often as is necessary to provide sufficient oxygen to sustain the aerobic microorganisms and allow cometabolic enzymatic degradation of the contaminants to further minimize or eliminate target contaminant loss through vaporization from the liquid contaminated stream. During the contaminant cometabolic degradation cycle, the process scheme for detoxification of liquid streams can be operated in either a single-pass mode or with closed-loop recycling of the air, liquid, or both. With single pass operation of both the air and liquid, the air is preferably fed to the top of the bioreactor. Closed loop recycle operation of the air stream can be employed during the contaminant cometabolic degradation cycle to improve process performance by controlling process parameters so as to meet gas and water emission discharge standards or regulations. For detoxification of liquid streams, closed-loop recycle operation during the primary substrate direct metabolic feeding cycle is the same as that described above for detoxification of gaseous streams.

For streams contaminated with compounds capable of direct metabolism by microorganisms, the cometabolic degradation cycle does not exist, and the processes of the instant invention consist of only a direct metabolic degradation cycle analogous to the said primary substrate direct metabolic degradation cycle, where the microorganisms' primary substrates, or food sources, become the is contaminants targeted for destruction by direct metabolism. For liquid-phase contaminated streams, the direct metabolic processes are operated using the novel closed-loop recycle schemes of the instant invention such that the processes are closed to the outside environment and the bioreactor air is recirculated in closed loop fashion to preclude any vapor release of the target contaminants from the liquid. The bioreactor is only opened and purged with fresh air for short periods, preferably not until contaminants have been completely metabolized and preferably no more often than is necessary to replenish the aerobic microorganisms with sufficient oxygen to continue direct metabolism of the contaminants through the next closed-loop recycle period. The liquid contaminated streams may be passed through the bioreactor on a continuous basis or charged to the bioreactor on a batch basis and recirculated until the desired degree of detoxification has occurred. For gaseous streams contaminated with compounds capable of direct metabolism, the biofilter may be charged on a batch basis with the gaseous stream to be decontaminated and then closed and operated with closed-loop recycle to preclude escape of contaminants to the environment during direct metabolism until the desired degree of decontamination has been achieved, at which time the biofilter is recharged with the contaminated gas stream and the process repeated.

Of course, it will be appreciated that in still other embodiments of the instant invention, there exist other variations to the processes of the instant invention illustrated by the example processes above which will appear to those skilled in the art without departing from the true spirit and scope of the instant invention.

DESCRIPTION OF THE PREFERRED EMBODIMENTS

Terms Used Herein

In the following discussion, it should be understood that unless otherwise clear from context the singular and plural are used interchangeably for brevity. For example, the process of the present invention can be used for the degradation of undesired organic chemicals in general; however, often the singular undesired organic chemical will be used.

Ex Situ Processes

"Ex situ" refers to outside of the contaminated environment as opposed to "in situ", which refers to inside or within the contaminated environment. In other words, an ex situ process refers to a separate and/or constructed process to which the contaminated stream is fed from the contaminated environment, whereas in situ methods refer to those in which the decontamination takes place within the contaminated environment, e.g. within the contaminated soil or groundwater without their prior removal.

Pollutant

In broad concept, a pollutant(s) in accordance with the present invention means any undesired compound which it is desired to degrade to a different desired form. The concepts of "undesired" and "desired" are of obvious flexibility, and are meant to include an essential change in the starting organic compound (pollutant) to a different form with different but preferred characteristics by the practice of the processes of the present invention.

It is our present view that the processes of the present invention will find most general use in the degradation of intractable compounds which are viewed today as harmful to the environment to a substance(s) which is accepted in context as harmless to the environment.

The pollutants which can be degraded by direct metabolism in accordance with the present invention are not especially limited so long they can be directly metabolized by the microorganisms as a sources of food and growth. In particular, a wide variety of volatile organic compounds (VOCs) such as alcohols, ethers, esters, ketones, aromatics, and alkanes (e.g. fuels) fit into the category of compounds that are capable of direct metabolism by naturally occurring microorganisms.

The pollutants which can be degraded by cometabolism in accordance with the present invention are not especially limited so long as form a cometabolic degradation system with the primary substrate(s) and the microorganism(s). While a wide listing of such pollutants is later provided, of special interest are the chlorinated aliphatic hydrocarbons, particularly such compounds which are unsaturated, such as 1,1,2-tri-chloroethane, 1,1-dichloroethane, 1,2-dichloroethane, trichloroethylene, cis-1,2-di-chloroethylene, trans-1,2-dichloroethylene, 1,1-dichloroethylene, 1-2-dibromoethane, and vinyl chloride. Of particular interest in cometabolic processes is trichloroethylene.

The Microorganism(s)

The microorganism(s) useful in the present invention are aerobic microorganisms which, in the presence of a primary substrate (which itself may be a pollutant), will produce an enzyme which will degrade the pollutant of interest. Aerobic, of course, means that oxygen must be present for the growth and reproduction of the microorganisms. In this regard, the term aerobic as used herein is not intended to have any other meaning than its conventional meaning. The oxygen needed to maintain an aerobic environment can come from any source, for example, air, pure oxygen, a compound which can be degraded to produce oxygen, but as a practical matter the oxygen is typically passed to the microorganisms in the system of the present invention in air. We presently see little, if anything, to be gained by using an oxygen source other than air due to increased costs.

The microorganisms useful in the practice of the present invention are preferentially naturally occurring aerobic microorganisms, as will now be discussed. These microorganisms are present everywhere in the environment. In particular, microorganisms useful in practice of the present invention are present in the environment and/or waste stream that is desired to be contaminated, so that there is no need for initial inoculation of the biofilters or bioreactors with isolated and concentrated pure cultures, as the cultures which best thrive on the waste streams fed to the biofilter or bioreactors will dominate, grow, and concentrate after feeding of the contaminated streams containing the adapted microorganisms is initiated.

However, though not necessary, there are certain methods available known by those of ordinary skill in the art and taught in the prior art that are capable of concentrating and enriching microorganisms from a site targeted for decontamination such that the resulting desired microorganism cultures are more dominant and such that, in certain cases, the time required for populating the biofilter or bioreactor with the optimum strains of microorganisms can be reduced.

It will be appreciated by one of ordinary skill in the art that the techniques now to be described are well known and conventional in the art for obtaining not only mixtures of microorganisms useful in accordance with the present invention (often called microbial consortia herein) but purified strains of such microorganisms isolated from soil or water.

One approach is to obtain a soil or water sample and enrich the sample for a mixture of microorganisms or isolate to form a purified culture of microorganisms with the ability to degrade one or more pollutants. One simple example procedure for obtaining a purified culture of microorganisms useful in accordance with the present invention comprises the steps of:

(1) collecting a sample of material from the site contaminated with obnoxious chemicals;
(2) enriching the microorganisms found living in the sample;
(3) separating the strains of microorganisms capable of having different metabolisms for the various chemicals in the sample from the site, from each other;
(4) purifying the strains which are capable of biodegrading the chemicals to be disposed of;
(5) applying the strain to the locus of the contaminants to be disposed of; and
(6) monitoring of removal of the contaminants in accordance with the process of the present invention.

Finally, microorganisms capable of degrading target halogenated aliphatic hydrocarbons or other compounds of interest can be selected from mixed cultures by growing the culture in the presence of an inducer (primary substrate) capable of stimulating cometabolic biodegradation, under conditions such that the culture is enriched for microorganisms capable of degrading the target pollutant. Pure cultures of such microorganisms can then be isolated by subculturing the enriched population using techniques well known to one of skill in the art.

More specifically, microorganisms can be isolated as follows. Soil samples are taken from the natural flora. A target halogenated aliphatic hydrocarbon (or other compounds targeted for decontamination), in the presence or absence of an inducer (primary substrate), is added to each sample. Microorganisms useful in the present invention may be isolated using many types of inducers, primary substrates, and/or target pollutants. Each sample is then analyzed for pollutant degradation compared to sterile controls. For each sample showing significant target pollutant degradation, aliquots of the sample are plated onto agar plates. Colonies of the microorganisms are grown and each is tested for its ability to degrade the target pollutant in the present or absence of an inducer.

A detailed procedure which can be used in accordance with the present invention with obvious modifications as disclosed in U.S. Pat. No. 4,925,802 Nelson et al. at col. 3, line 53 to col. 4, line 43 is hereby incorporated by reference.

A listing of primary substrates, microorganisms, and enzymes, where available, is later provided.

Biodegradation Media or Support

The microorganism(s) of the present invention can be immobilized or supported on biodegradation media or packing, or they can be recirculated in the form of a nutrient-microorganism suspension spray through the process, as will be described in more detail in Example 7, infra. The packing type of the present invention is not important to the practice of the present invention so long as the packing does not significantly harm the microorganism (s) or cometabolic enzymes and permits adequate contact of the primary food sources and target pollutants. Of course, the packing or support must retain the microorganisms thereon and not itself be too rapidly degraded during the process of the present invention so that undesired early packing or support replacement is needed. So long as the above criteria are met, the substrate can be freely selected from natural or synthetic materials or a mixture thereof. Examples are later given.

Biofilters/Bioreactors

The actual cometabolic or direct metabolic degradation of pollutants to harmless byproducts with accordance of the present invention occurs in and on a supported living mass of microorganisms which are in an aqueous environment, i.e., which are kept moist. By "aqueous environment", we simply mean that sufficient water is present with the microorganisms to support their life and permit the pollutants to contact the microorganisms and/or enzymes they produce where the pollutants will be degraded to harmless byproducts.

Where the pollutants are initially fed to the processes of the present invention in the form of a gas stream which passes over and through the supported bed of microorganisms, this system of the present invention is called a biofilter system.

Where the pollutants are initially fed to the processes of the present invention in the form of an aqueous stream carrying the pollutants which passes over and through the supported bed of microorganisms, this system of the present invention is called a bioreactor system.

In actuality, there is little difference between a biofilter system and a bioreactor system since in each instance the pollutants are contacted with the microorganisms or the enzymes which degrade the pollutants to harmless byproducts, through and in the aqueous environment in which the microorganisms exist.

Batch, Continuous, Single-Pass, and Recycle

A batch process is one in which the process flows enter the reactor for a specific period of time and then stop, and the contents of the reactor are then allowed to act on the reactants in a mixed, recirculated, or non-mixed state until such time that the desired changes in the reactor contents are achieved, after which the contents of the reactor are removed, and the reactor is then filled with another batch of reactants and the process is repeated. A continuous process is one in which the process flows continuously enter and leave the reactor such that the desired change in the reactants is achieved as they pass through and out of the reactor. Single-pass means that the reactants pass through the reactor one time, where as recycled means that part of the reactor effluents are fed back into the reactor or are fed back into the reactor influent process streams. Combinations of batch and continuous mean that the process is operated on a batch basis part of the time and on a continuous basis part of the time. Combinations of single-pass and recycled simply mean that the process flows are single pass part of the time and recycled part of the time, either all or in part, back to the reactor. Batch recycle simply means that the reactor contents are moved out of the batch reactor and put back into the batch reactor with no net process flows entering or leaving the reactor, as is the case with closed-loop recycle operation. With continuous operation, the are net flows entering and leaving the process.

Closed Loop Recycle/and Preventing Comingling of Process Streams Pertaining to Cometabolic Processes The following pertains to the concepts of closed loop recycle and preventing commingling (substantial) of process streams during such closed-loop recycle for pollutants requiring cometabolism. Hereinafter we often refer to these concepts simply as closed-loop recycle and preventing commingling of process streams. As will be clear from the following discussion, however, the process streams are a primary substrate rich stream and a pollutant rich stream. Ignoring the sorption of pollutant and primary substrate into the microorganism packing or support bed, which is later discussed in detail, a rather transient interruption in the concept of not commingling process streams in accordance with the present invention, due to the competition between the primary substrate and the pollutant with respect to the microorganisms, in an ideal process, the primary substrate rich stream and the pollutant rich stream would be separate, distinct streams without any primary substrate in the pollutant rich stream and, conversely, without any pollutant in the primary substrate rich stream. This ideal process is, however, impractical in practical commercial operation where one is typically treating very large amounts of a pollutant laden gas (biofilter) or a pollutant laden waste water stream (bioreactor). Thus, the practical realities of the process of the present invention with regard to cometabolic processes are now discussed with reference to the balance and trade-offs involved.

The processes of the present invention for cometabolic processes involves two cycles, one where the primary substrate rich stream is contacted with the support bed containing microorganisms (feed cycle) and one where the pollutant rich stream is contacted with the support bed containing microorganisms for contact with the degrading enzymes via a cometabolic pathway (degradation cycle).

The concept of closed-loop recycle in accordance with the present invention for cometabolic processes is intimately related to the concept of preventing substantial commingling of the primary substrate rich stream and the pollutant rich stream during the process of the present invention.

For pollutants requiring cometabolic degradation, the processes of the present invention always involve two substantially distinct process streams, one of which can be viewed as a primary substrate rich stream and the other of which can be viewed as a pollutant rich stream.

The function of the primary substrate rich stream is to carry the primary substrate to the mass of microorganisms on the packing used so that the primary substrate can be consumed by direct metabolism as a food source by the microorganisms, to sustain life and reproduction of the microorganisms and induce the microorganisms to produce the enzymes needed for the cometabolic degradation of the pollutant.

The function of the pollutant rich stream is to bring the pollutant into contact with the enzymes generated by the microorganisms for the cometabolic degradation of the pollutant by the enzymes.

Either or both of the primary substrate rich stream or the pollutant rich stream can be contacted with the microorganisms on the packing in the closed loop recycle mode. However, as will later be explained in more detail, it is most preferred that at least the primary substrate rich stream be contacted with the microorganisms on the packing in the closed loop recycle mode.

Thus, by closed loop recycle mode, we mean that either the primary substrate rich stream, the pollutant rich stream (or both, albeit in different cycles) is contacted with the microorganisms on the packing aid repeatedly passed over and through the microorganisms on the packing until the desired degree of nutrition and feeding and associated generation of the target-pollutant-degrading enzymes is achieved (feed cycle) or repeatedly passed over the microorganisms on the packing until the desired degree of target-pollutant degradation is achieved (cometabolic degradation cycle).

In closed-loop recycle operation, the loop, which can be in the form of piping, ductwork, or other appropriate materials for transfer of fluids, serves only as a means to transfer the interior contents of the biofilter or bioreactor from one point to another within the closed system, for example, from the effluent port to the influent port, to enable the internal contents of the closed biofilter or bioreactor to be repeatedly recirculated or passed through the biofilter or bioreactor where the biodegradation is occurring. The loop, or conduit, to facilitate closed-loop recycling or recirculation is not considered to be an important part of the process with respect to biodegradation occurring in the loop as compared with the biodegradation occurring in the biofilter or bioreactor degradation media. Although it is possible for biodegradation to occur as the materials flow through the closed loop, or conduit, during recycle from one point in the biodegradation media to another, it is not considered to be a major point of biodegradation as it does not normally contain major concentrations of the microorganisms. One case in which some biodegradation would occur in during transfer through the loop would be in the case of using closed-loop recirculation of a nutrient-microorganism spray instead of support or packing, as described supra, and as described in more detail in Example 7, infra.

However, this "closing" of the recirculating primary substrate rich stream or pollutant rich stream does not absolutely preclude the addition small quantities of materials so long as such addition does not adversely affect the desired function of these two cycles, primarily microorganisms nutrition/inducement of enzyme production for the subsequent cometabolic pollutant degradation during the contact of the pollutant rich stream with the microorganisms on the packing. Thus, the spirit of the process of the present invention for cometabolic processes is not avoided by, for example, adding some incidental amount of primary substrate during the feed cycle, so long as the desired functions of these cycles can be achieved.

Obviously the concept of achieving the desired function of a cycle is one of degree, and not subject to precise quantification. As general guidelines, however, clearly if the nature of a recirculating primary substrate rich stream were changed so as to affect the feed cycle to the point where the microorganisms on the packing were harmed or enzyme generation was insufficient to achieve the desired degree of target pollutant degradation, that would be a substantial impairment of that particular cycle.

Although the factors involved with respect to the nature of a recirculating pollutant rich stream are somewhat different, if the nature of such a recirculating stream were changed so that undesirable affects resulted, for example, excessive competition between the primary substrate and the pollutant so that pollutant degradation was harmed, excessive time required for the desired degree of pollutant degradation, etc., quite obviously that would be a substantial impairment of the degradation cycle.

The above discussion should make clear the concept of precluding substantial commingling of the primary substrate rich stream (feed cycle) and the pollutant rich stream (cometabolic degradation cycle) in accordance with the present invention.

On a lab or bench scale, one could theorize a system where the primary substrate is contacted with the microorganisms on the packing until all desired effects of the direct metabolism feed cycle are achieved in the complete absence of the target pollutant, the system is purged with, e.g., pure oxygen under conditions controlled to ensure maximum microorganism health and enzyme production, and thereafter the pollutant rich stream is introduced, whereafter the system is purged with, e.g., pure oxygen under similar controlled conditions are achieved.

However, on a practical commercial level such two completely distinct, separate systems are not practical or feasible. Thus, on a practical commercial level there will always be some, albeit at times very low, amount of target pollutant in the primary substrate rich stream and some primary substrate in the pollutant rich stream. This is because of the cycling of the primary substrate rich stream (feed cycle) followed by the cycling of the pollutant rich stream (cometabolic degradation cycle).

Having thus discussed the general terms used in the present invention, we now turn to a more detailed explanation of the present invention for pollutants requiring cometabolism.

Cometabolism

To appreciate the present invention for pollutants requiring cometabolism for degradation, it is necessary to understand the cometabolism process which is used in the present invention. Cometabolism is a known process. In the context of the present invention, cometabolism involves:

at least one microorganism (typically a consortium or plurality of microorganisms);

at least one target compound or contaminant (which for many applications of the present invention may be the only target compound or contaminant of any practical interest); and at least one primary substrate, which may be considered a food source for the at least one microorganism.

Oxygenases are enzymes that catalyze the incorporation of oxygen ($O_2$) into organic compounds. There are two kinds of oxygenases: dioxygenases catalyze the incorporation of both atoms of $O_2$ into the molecule and monooxygenases catalyze the transfer of only one of the two $O_2$ atoms to an organic compound as a hydroxyl (OH) group, with a second atom of $O_2$ ending up as water, $H_2O$. Because monooxygenases catalyze the formation of hydroxyl groups (OH) in organic compounds, they are sometimes called hydroxylases. Because monooxygenases require a second electron donor to reduce the second oxygen atom to water, they are also sometimes called mixed-function oxygenases.

Various kinds of microorganisms, for example, Nocardia, Pseudomonas, Mycobaterium, and certain yeasts and molds, can utilize hydrocarbons for growth. Utilization of aliphatic hydrocarbons by aerobic microorganisms is strictly an aerobic process; in the absence Of $O_2$, hydrocarbons are unaffected by aerobic microbes. The initial oxidation step of aliphatic hydrocarbons involves molecular oxygen ($O_2$) as a reactant, and one of the atoms of the oxygen molecule is incorporated into the oxidized hydrocarbon. In the oxidation of aliphatic hydrocarbons, monooxygenases are most generally involved, and the initial oxidation need not be at a terminal carbon in all cases.

The breakdown of aromatic hydrocarbons involves the action of either oxygenases or mixed-function oxygenases.

It is known that organisms that are able to metabolize halogenated compounds are fairly diverse, including genera of both bacteria and fungi. Some halogenated compounds serve well as carbon and energy sources and are oxidized completely to $CO_2$. However, other compounds are much more recalcitrant, and are attacked only slightly or not at all, although they may often be degraded provided some other organic material is present as a primary energy source, a phenomenon called cometabolism.

Thus, in the context of the present invention, cometabolism is the microbial transformation of a compound, often called a target compound or contaminant, that cannot be used for growth or energy. As a consequence, for the cometabolic process to occur there must be a primary substrate (food) available that the microorganisms can use for energy and growth. A result of the microorganisms utilizing the primary substrate is the production of an enzyme that will catalyze the transformation or degradation of the undesired target compound or contaminant in an aqueous environment to relatively harmless or relatively innocuous end products. The transformation or degradation of the undesired contaminants occurs due to the non-specific nature of the enzyme(s) produced from the primary substrate (s). The cometabolic process is the principle degradation pathway for several highly recalcitrant compounds.

TCE, a target compound or contaminant of particular interest in accordance with the present invention, can be degraded by methanotrophs, phenol degraders, propane oxidizers, ammonia oxidizers, toluene degraders, and others as a result of their ability to produce the nonspecific enzymes necessary for the cometabolic process to occur. The enzymes involved in TCE degradation by these organisms include methane monooxygenase, toluene dioxygenase (TOD), toluene-2-monooxygenase (TON), toluene-3-monooxygenase (TBU), toluene-4-monooxygenase (TMO), propane monooxygenase, and ammonia monooxygenase. These organisms only produce the cometabolic enzymes when exposed to specific growth substrates, usually easily identified from their name. For example, a phenol-degrading bacteria may be capable of using glucose as a growth substrate, but under this condition, it will not produce the oxygenase enzymes which enable the cometabolic transformation of chlorinated aliphatic compounds (CACs). Phenol must be present within the system to stimulate appropriate enzyme production.

Hereinafter, the following abbreviations are used: CAC—chlorinated aliphatic compound; PAH—polyaromatic hydrocarbon (or polynuclear aromatic hydrocarbon); PCB—polychlorinated biphenyl; and TCE—trichloroethylene.

It is contemplated that the processes of the present invention will find application with all of the following cometabolic-based processes.

For example, Providenti, M. A., H. Lee & J. T. Trevors (1993) Selected factors limiting the microbial degradation of recalcitrant compounds. *Journal of Industrial Microbiology* 12, 379–395, teach a variety of target compounds or contaminants can be degraded through cometabolism, for example the aerobic degradation of PCB may require a cometabolite such as biphenyl, 4-chlorobiphenyl, benzoate or 2-chlorobiphenyl; the aerobic degradation of 1- and 2-chloronaphthalenes requires naphthalene; the aerobic degradation of high molecular weight PAHs such as dibenzothiaphene, pyrene and fluoranthrene requires an alternate carbon source such as glucose; the aerobic degradation of 1 and 2 carbon atom chlorinated aliphatic compounds, e.g., TCE, has been shown to occur with the cometabolic oxidation of methane, propane, formate, phenol, toluene, or ammonia.

A substantial amount of prior art teaches cometabolic systems for the transformation or degradation of CACs including TCE as now discussed in detail.

Vanelli et al 1990, Degradation of Halogenated Aliphatic Compounds by the Ammonia-Oxidizing Bacterium Nitrosomonas europaea. *Appl. Environ. Microbiol.* 56:1169–1171, dealing with CACs such as dichloromethane dibromoethane, chloroform, bromoethane, 1,2-dibromoethane, 1,1,2-trichloroethane, 1,1,1-trichloroethane, 1,2,3-trichloropropane, vinyl chloride and TCE, where the primary substrate is ammonia, the responsible organism is *Nitrosomonas europaea* and the enzyme is ammonia monooxygenase.

CACs including TCE, Fox et al, 1990, where *Methylosinus trichosporium* OB3b utilizes methane as the primary substrate in a cometabolic process. The enzyme methane monooxygenase is produced and CACs are degraded.

CACs, including TCE, where the primary substrate is methane and/or propane, and the responsible organisms are a propane and methane oxidizing consortium.

Chang Alvarez-Cohen, 1995. Model for the cometabolic biodegradation of chlorinated organics. Environ. Sci. Technol. 29: 2357–2367, where microorganisms produce non specific oxygenase enzymes that can oxidize both their parent growth substrate and the cometabolic substrate. The oxidation of CACs, including TCE, generates short-lived intermediate products that damage cells and inactivate enzymes.

Ely et al, 1997, Cometabolism of Chlorinated Solvents by Nitrifying Bacteria: Kinetics, Substrate Interactions, Toxicity Effects, and Bacterial Response. *Biotechnology and Bioengineering*, vol. 54, No. 6, 520–534; pure cultures of ammonia-oxidizing bacteria, *Nitrosomonas europaea*, can cometabolize CAC's, including TCE, in the presence of ammonia. The nonspecific enzyme produced is ammonia monooxygenase.

The following references are specific to the cometabolic transformation or degradation of TCE.

Wackett et al 1988. "Degradation of Trichloroethylene by Toluene Dioxygenase in Whole-Cell Studies with *Pseudomonas Putida* F1." *Appl. Environ. Microbiol.* 54(7): 1703–1708; TCE is degraded through cometabolism. The organism *Pseudomonas putida* F1 is induced with toluene to produce the nonspecific enzyme toluene dioxygenase capable of the degradation of TCE.

Hopkins et al, 1993, where the primary substrate is phenol and a mixed microbial consortium is used.

Folsom et al 1990, Performance of a Recirculating Bioreactor for the Degradation of TCE. Bioremediation of Hazardous Wastes. EPA/600/9-90/041. U.S. Environmental Protection Agency, Office of Research and Development, Biosystems Technology Development Program, Washington, D.C. Pp. 6–8 (ERL,GB X726), where the primary substrate(s) is toluene, o-cresol, m-cresol or phenol and *Pseudomonas cepacia* strain G4 is used.

Alexander's Gas and Oil Connection Reports. "Bioremediation of hydrocarbon pollutants with butane-utilizing bacteria." Volume 4, issue #9—Tuesday, May 11, 1999, where the primary substrate is butane and butane-utilizing bacteria are used, suitable butane-utilizing bacteria include suitable Pseudomonas, Variovorax, Nocardia, Chryseobacterium, Comamonas, Acidovorax, Rhodococcus, Aureobacterium, Micrococcus, Aeromonas, Stenotrophomonas, Sphingobacterium, Shewanella, Phyllobacterium, Clavibacter, Alcaligenes, Gordona, Corynebacterium and Cytophaga.

Wilson, J. T. and B. H. Wilson. 1985 Biotransformation of trichlorethylene in soil. Appl. Env. Microbiol. 49, 242–243, where the primary substrate is methane and a mixed methantrophic microbial consortium is used, specifically a soil column taken from a CAC contaminated site containing a natural population of microorganisms that would degrade TCE when stimulated with methane. This is the first reference that noted aerobic TCE degradation.

Arciero, D., T. Vanelli, M. Logan, and A. B. Hooper, 1989. Degradation of trichloroethylene by the ammonia-oxidizing bacterium *Nitrosomonas europaea*. Biochem. Biophys. Res. Commun. 159, 640–643, disclosing the use of *Nitrosomonas europaea*, an ammonia-oxidizing bacteria, to degrade TCE through cometabolism. The primary substrate for this system is ammonia. The non-specific enzyme produced through ammonia induction is ammonia monooxygenase.

Brucceau, G. B., H. C. Tsien, R. S. Hanson, L. P. Wackett. 1990. Optimization of trichloroethylene oxidation by methanotrops and the use of colorimetric assay to detect soluble methane monooxygenase activity. Biodegradation. 1:

19–29, where TCE is degraded by methanotrops through a cometabolic process that utilizes the enzyme methane monooxygenase.

Hopkins, G. D., J. Munakata, L. Semprini, and P. L. McCarty. 1993. Trichloroethylene concentration effects on pilot field-scale in-situ groundwater bioremediation by phenol-oxidizing microorganism. Environ. Sci. Technol. 27: 2542–2547, where phenol is used as the primary substrate for a mixed microbial consortium.

Little, C. D., A. V. Palumbo, S. E. Herbes, M. E. Lidstrom, R. L. Tyndall, and P. J. Gilmer. 1988. Trichloroethylene biodegradation by a methane-oxidizing bacterium. Appl. Environ. Microbiol. 54: 951–956, disclosing the use of methanotrops where methane is the primary substrate to induce the production of the monooxygenase enzyme.

Oldenhuis, R. R., J. M. Vink, D. B. Janssen, and B. Witholt. 1989. Degradation of chlorinated aliphatic hydrocarbons by *Methylosinus trichosporium* OB3b expressing soluble methane monooxygenase. Appl. Environ. Microbiol. 55, 2819–2826, where *Methylosinus trichosporius* OB3b used methane to generate the nonspecific soluble enzyme methane monooxygenase to degrade TCE through a cometabolic process. Tsien, H. G., G. A. Brusseau, R. S. Hanson, and L. P. Wackett 1989. Biodegradation of trichloroethylene by Methylosinus trichosporium OB3b. Appl. Environ. Microbiol. 55:3155–3161, where *Methylosinus trichosporius* OB3b used methane to generate the nonspecific soluble enzyme methane monooxygenase to degrade TCE through a cometabolic process.

Phelps et al, 199 1, disclosing the use of a consortium of organisms capable of utilizing methane and/or propane to produce nonspecific enzymes that are capable of degrading TCE and other CACs.

Wackett, J. J., J. W. Mello, and R. F. 1984. The groundwater supply survey. J. Am. Water Works Assoc. 5,52–59, disclosing the use of propane oxidizing organisms which are induced to produce a nonspecific oxygenase enzyme that is capable of degrading TCE.

The process of the present invention is not, of course, limited to the above compounds. It is expected that the process of the present invention will be operable with the following cometabolic systems as taught in the following references.

Brunner, W., F. H. Sutherland, and D. D. Focht. 1985. "Enchanced Biodegradation of Polychlorinated Biphenyls in Soil by Analog Enrichment and Bacterial Inoculation" *J. Environ. Qual.*, Vol. 14, 324–328, where the target compounds are PCBs, the primary substrate is biphenyl, and Acinetobacter is used.

Mahaffey, W. R., D. T. Gibson, and C. E. Cemiglia. 1988. "Bacterial Oxidation of Chemical Carcinogens: Formation of Polycyclic Aromatic Acids from Benz[a]anthracene." *Appl. Environ. Microbiol.* 54(10), 2415–2423., where the target compound is PAH benzo[a]anthracene, the primary substrates are m-xylene, biphenyl and salicylate, and wherein Beijerinckia Strain B-1 is used.

Mueller, J. G., P. J. Chapman, B. O. Blattmann, and P. H. Pritchard. 1990. "Isolation and Characterization of a Fluoranthene-Utilizing Strain of *Pseudomonas paucimobilis.*" *Appl. Environ. Microbiol.*, 56(4), 1079–1086, wherein the target compound is a PAH (pyrene 1,2-benzanthracene 3,4-benzpyrene 1,2,5,6-dibenzanthracene), the primary substrate is naphthalene, phenol or naphthalene and *Pseudomonas paucimobilis* is used.

The above publications, from Providenti through Mueller, are hereby incorporated by reference with regard to their teachings on microorganisms and primary substrates.

In carrying out the objects of our present invention, novel, efficient, and economical ex situ processes utilizing closed-loop recycle schemes have been developed for ometabolic degradation of chloroethylenes and other contaminants which alone are not easily or efficiently degraded by naturally occurring microorganisms and for direct metabolism of a wide variety of other pollutants or other undesirable compounds. The processes of the present invention are not limited to utilization of any particular type of microorganism and preferably utilize naturally occurring microorganisms which are widely available in the environment, are easily obtainable from sources such as soil sediments and groundwater, are available in the waste streams to be decontaminated, and are widely taught in the prior art, supra. Examples of such naturally occurring microorganisms which may be utilized in the processes of the present invention include those discussed in the prior art previously incorporated by reference (U.S. Pat. No. 4,713,343, Wilson and Wilson, 1985; Wilson and Wilson, 1985; Fliermans et al. 1988; Wackett et al. 1989; Arciero et al. 1989; Hopkins et al. 1993; Nelson et al. 1987; Brusseau et al. 1990; Fox et al. 1990; Little et al. 1988; Oldenhuis et al. 1989; Tsien et al. 1989; Fennell et al.1993; Strandberg et al. 1989; Tschantz et al. 1995; Alvarez-Cohen and McCarty, 1991; Semprini et al. 1990; Semprini et al. 1991; Chang and Alvarez-Cohen, 1995; Phelps et al., 1991; Lackey, et al. 1993; Lackey et al. 1994).

The cometabolic processes of the present invention utilize primary substrates to induce enzymatic degradation of target pollutants such as chloroethylenes, particularly TCE, or other contaminants amenable to such enzymatic degradation but which alone are not easily or efficiently biodegraded by such naturally occurring microorganisms. Further, the cometabolic processes of the present invention are operated in a cyclical fashion such that feeding of the waste or contaminated streams is separated from feeding of the primary substrate streams into separate and discrete process cycles to minimize or eliminate co-mingling of the primary substrate with the target contaminants, which is known to inhibit degradation of the target contaminants through competitive inhibition by the primary substrate. Most importantly, the processes of the present invention utilize novel closed-loop recycle schemes which dramatically improve the efficiency, economics, and practicability of degrading chloroethylenes, particularly TCE, and other such amenable contaminants requiring cometabolism. During the closed-loop recycle periods, the processes are completely closed to the outside environment with little or no net process flows entering or leaving the process. Scientific wisdom dictates that the oxygen demand during closed-loop recycle should deplete the oxygen supply, resulting in loss of the aerobic microorganisms and failure of the process. Unexpectedly, oxygen levels are reduced only slightly, defying conventional scientific wisdom concerning the function of the aerobic microorganisms, and dramatic improvements in process efficiency and economics are achieved.

The novel closed-loop recycle schemes of the present invention for cometabolic processes take advantage of the adsorption-desorption dynamics within the biodegradation media and (1) provide efficient and complete direct metabolism of primary substrates (food sources), whether they themselves be pollutants or harmless compounds, without loss or venting to the primary substrates to the environment,
(2) allow enzymatic degradation (cometabolism) of sorbed or residual target contaminants during feeding of the primary substrates to the microorganisms without loss or venting of the primary substrates or target contaminants to the environment, (3) virtually preclude co-mingling of primary substrates with target contaminants and thereby achieve high target contaminant degradation efficiency, (4) utilize naturally occurring microorganisms widely available in the environment, and (5) self-optimize to maintain the optimal microbial types and populations without the need for microorganism replenishment or modification, thus dramatically improving the simplicity, economics, and practicability of such processes.

The novel closed-loop recycle schemes of the present invention for direct metabolic degradation processes (consumption of the target pollutants) also take advantage of the adsorption-desorption swings within the biodegradation media and (1) provide efficient and complete direct metabolism of the contaminants without loss or venting of the contaminants to the environment, (2) utilize naturally occurring microorganisms widely available in the environment, and (3) self-optimize to maintain the optimal microbial types and populations without the need for microorganism replenishment or modification, thus dramatically improving the simplicity, economics, and practicability of such processes.

The novel closed loop recycle schemes of the present invention may be used for treating either gas- or liquid-phase streams containing contaminants capable of direct metabolism and/or contaminants requiring cometabolism. The processes may be applied on a batch or continuous basis to contaminated soil and groundwater, to contaminated effluents from a wide variety industrial operations such as solvent degreasing, or to wherever chloroethylenes or other such amenable contaminants exist.

The processes of the present invention are microbially self-optimizing in that the process schemes and parameters of the present invention bring about the adaptation, dominance, and maintenance of the microbial types and populations within the biodegradation media for optimal degradation of the target contaminants, without the need for replenishing the processes with pure, externally grown microbial strains and without the need for the initial inoculation of the processes with specially cultured, externally grown strains of microorganisms. A preferred embodiment of present invention for pollutants requiring cometabolic degradation is the use of automatic, cyclically operated, ex situ biofilter or bioreactor processes in which feeding of the waste or contaminated streams is separated from feeding of the primary substrate streams into separate and discrete process cycles to minimize or eliminate co-mingling of the primary substrate with the target contaminants. Thus, the primary substrate streams are fed to the process part of the time to feed the microorganisms and activate the enzymes necessary for contaminant degradation, and the contaminated streams are fed to the process part of the time to effect degradation of the contaminants as they pass through the process. Continuous operation of the process can be provided by operation of dual biofilters or bioreactors so that one is being fed the waste streams while the other is being fed the primary substrate streams. The waste streams and primary substrate streams are then automatically switched to the alternate bioreactors/biofilters in cyclical fashion to allow continuous feeding of the contaminated streams and primary substrate streams. However, the processes may be operated on a batch basis or in an intermittent fashion as well. In addition, the process may be operated in a single pass mode or with recycle of the primary substrate and contaminated streams. To allow use of only one bioreactor/biofilter in the process, the incoming waste streams are stored as surge in a surge vessel for a period of time while the single bioreactor/biofilter is being fed the primary substrate stream to feed the microorganisms and activate enzymes needed for contaminant degradation. After a period of time, the primary substrate stream to the single bioreactor/bioreactor is discontinued, and the single bioreactor is then fed the stored waste stream to deplete the stored surge as well as the waste stream entering the surge vessel. The waste stream is detoxified by biodegradation as it passes through the bioreactor/biofilter containing the necessary enzymes. Of course, if flow of the contaminated streams are required to be continuous to the process, the surge vessel is required to be of such size so as to accommodate the quantity of stored waste stream dictated by the continuous flow rate of the waste stream and the period of time for which the waste stream is to be stored.

The respective periods of time allowed each for flow of the primary substrate streams and flow of the contaminated streams and the periods of time allowed for each cycle of the process must be controlled to specific values to achieve the required performance characteristics for the process for the decontamination of a given site- and application-specific waste stream. The period of time allowed for each cycle of the process is not necessarily equal to the period of time allowed each for flow of the primary substrate streams or contaminated streams. Control and manipulation of these process variables dramatically affect process efficiency and economic viability and specific values for these process parameters are dependent on the characteristics of the waste and primary substrate streams, the performance characteristics required of the process, and other important considerations.

The most preferred embodiment of the present invention for pollutants requiring cometabolic degradation involves use of closed-loop recycle during the feeding cycle when the process is not receiving the target contaminant stream, although closed-loop recycle can also be beneficially employed during at least part of the target contaminant degradation cycle, particularly in applications involving detoxification of liquid streams as previously described in DESCRIPTION OF THE DRAWINGS, supra. Practice of the processes of the present invention for cometabolic processes without use of the closed-loop recycle schemes results in drastic loss of process performance and economics. A principal advantage of the closed-loop recycle schemes involves savings in operating cost by dramatic reduction in the quantity of primary substrate required, because all of the primary substrate is consumed within the process. However, other important advantages of the closed-loop recycle schemes follow and are explained more fully in the EXAMPLES, infra, for the case involving TCE as the contaminant in a gas stream and propane as the primary substrate. During the closed-loop recycle feeding period, TCE adsorbed in the biofilter packing during the previous target contaminant cometabolic degradation cycle is also enzymatically degraded with none released to the environment, so that when TCE is again introduced to the biofilter after the closed-loop recycle period, the level of adsorbed TCE in the packing is lower; thus, the packing has more capacity to remove TCE through a combination of adsorption and cometabolic degradation. Without the closed-loop recycle scheme, the TCE adsorbed in the packing and not yet destroyed by microorganisms during the contaminant degradation cycle is desorbed from the packing and released to the environment when the direct metabolism feeding cycle again begins. Without closed-loop recycle during primary substrate feeding (single-pass feeding mode), effluent TCE concentrations are higher during the propane feeding cycle (when the process is not receiving TCE) than during the TCE cycle (when the process is receiving TCE). Thus, the apparent TCE removal rate during the TCE cycle appears to be very high, but when the TCE released to the environment during the feed cycle is included in the overall material balance on influent and effluent TCE for the system, the realized TCE degradation efficiency (and rate) is much lower, as will become apparent in the following examples.

EXAMPLES

In order that those skilled in the art may better understand how the present invention may be practiced for simple, effective, and economical ex situ biodegradation of chloroethylenes, particularly TCE, and other such amenable contaminants targeted for detoxification, the following examples are given by way of illustration only and not necessarily by way of limitation. The experimental results herein were obtained with a mobile Biofiltration Process Demonstration Unit, herein after referred to as the "Demonstration Unit", mounted on a tractor trailer bed and installed in an area adjacent to groundwater air stripping and carbon filtration units at a site with TCE-contaminated groundwater.

Example 1

The Demonstration Unit consisted of an air stripper section and a biofilter section. The demonstration stripper was included only to allow variation in the TCE concentration and rate of the air fed to the biofilter. Contaminated groundwater from six wells is pumped to a collection sump and subsequently pumped to the air strippers, which discharge TCE-contaminated air to the atmosphere. This collection sump was the source of contaminated water for the stripper on the Demonstration Unit. Depending on the operating conditions chosen, part or all of the groundwater flowing into the collection sump was pumped to the demonstration stripper where TCE and other volatile organic compounds (VOCs) were stripped from the groundwater and transferred to the stripper's effluent air stream. The air and water rate to the stripper were manipulated to control the rate and TCE concentration of the contaminated air fed to the biofilter. The contaminated air from the stripper was fed to the inlet of the biofilter and passed through the biofilter to allow the microorganisms to destroy TCE and other chlorinated organic compounds, and the treated air was released to the atmosphere.

The demonstration stripper consisted of a 32-inch diameter, 9-foot high, 304 stainless steel tower packed with pall rings designed to maximize liquid-to-air contact. To operate the demonstration stripper, contaminated groundwater was pumped from the collection sump to the top of the stripper and allowed to flow down through the packing while fresh air flowed up through the bottom of the stripper. Volatile organic compounds in the groundwater were transferred, or stripped, from the groundwater stream to the air stream. The treated water leaving the demonstration stripper collected in a sump at the bottom of the stripper and was then pumped to the site's stripper for further processing. Air entering the demonstration stripper was drawn into the bottom of the vessel by a blower mounted on the discharge end of the demonstration stripper.

During the demonstration, the inlet air and water flow rates to the demonstration stripper were manipulated to control both the TCE concentration and the TCE flow rate entering the biofilter. The air flow rate was set by a programmable controller. The water flow rate through the demonstration stripper was controlled by an automatic control valve and control loop using an inline magnetic flow meter and flow controller.

The TCE-contaminated air leaving the demonstration stripper passed through the blower, flowed through the biofilter, and was discharged into the atmosphere.

The biofilter section of the Demonstration Unit consisted of a rectangular vessel packed with a mixture of composted poultry litter and pine bark to support the microorganisms, as shown in the Table below.

| Composition of Biofilter Packing Material | |
|---|---|
| Material | Weight % |
| poultry litter/pine bark compost | 57 |
| water | 36 |
| dolomitic limestone | 5 |
| chopped kenaf | 2 |

After installation of the biofilter system, the biofilter packing was inoculated with a naturally occurring heterotrophic microbial consortium obtained from several sites. This inoculum included both methane and propane-oxidizing consortiums obtained from Ada, Okla., a methanotroph from a waste disposal site near Oak Ridge, Tenn., and a TCE-degrading consortium from the Savannah River Plant, Aiken, S.C. This heterotrophic microbial consortium was capable of degrading TCE and many other chlorinated aliphatic and aromatic compounds (Lackey, et al. 1994). After being introduced to the biofilter, the microorganisms were allowed to grow and acclimate by passing air and propane through the biofilter for about a month prior to starting flow of the contaminated air.

With respect to the microbial cultures used in our Demonstration Unit, they were originally derived from sediments containing naturally occurring microorganisms collected in the field and grown as described in Lackey, et al. 1994. Feasibility testing for the on-site bioremediation of organic wastes by native microbial consortia. International Biodeterioration & Biodegradation. 33:41–59., the complete text (pp. 41–59) of which is hereby incorporated by reference. The microbial consortium is identified on page 43 as follows:

"Selection of Microbial Consortia

The consortium used for both test tube and bioreactor studies contained mixtures of propane and methane-oxidizing bacteria obtained from the vicinity of Ada, Okla. (Wilson & Wilson, 1985), a TCE-degrading consortium isolated from the Savannah River Plant, Aiken, S.C. (Fliermans et al., 1988; Phelps et al., 1989) plus a methanotroph isolated from a waste disposal site near Oak Ridge, Tenn. The consortium was maintained on a phosphate and bicarbonate buffered mineral salts medium (Fliermans et al., 1988) supplemented with 5% methane and 3% propane (v/v, headspace)."

Samples of the microbial consortium cited, supra, (Lackey, et al. 1994) were cultured to increase their population in the presence of air, propane, and TCE and then added to the compost packing of a bench-scale biofilter which was fed only air, propane, and TCE; the developments made in this biofilter led to the demonstration of the process as described herein. Propanotrophic, TCE-degrading microorganisms from the packing of this bench-scale biofilter, which had adapted and self-optimized the microbial types and populations to those which provided the optimum process performance, were used to inoculate the larger biofilter of the Demonstration Unit as described herein. Although the microbial consortium in the Demonstration Unit is likely different in makeup than that described in Lackey, et al., 1994, due to differing process parameters, we firmly believe that one can use the field collected source sediments as an inoculum for the processes of the present invention, feed the process propane and TCE exclusively, and the process will self-optimize the microbial consortium, adapting and developing within the biodegradation media the optimum microbial consortiums to achieve optimal process performance and economics, since the said source sediments were the initial starting materials from which the microbial consortium in the Demonstration Unit was derived. The same is firmly believed to hold true for utilizing source sediments from sites contaminated with other amenable contaminants as the microbial starting materials for practicing the present invention for such enzymatic degradation of said other amenable contaminants through primary substrate inducers.

Indeed, we further believe that the biodegradation media within the processes of the present invention can be inoculated with the site waste stream to be treated or with soil sediments or water collected from widespread environments that are contaminated with TCE or other amenable contaminants targeted for detoxification and that contain diverse, wild-type indigenous microorganisms which have adapted to presence of TCE or other such amenable contaminants in soil or groundwater, as is amply described in prior art, or they may not be inoculated at all. There is no need to grow, isolate, and use specialized microbial cultures or strains. The present invention's novel closed-loop recycle schemes with repeated cyclical and alternating feeding of the primary substrate streams and contaminant streams have the effect of forcing the adaptation, growth, and dominance of the optimum microbial types and populations within the biodegradation media to effect the most efficient and economical degradation of the target contaminants. In other words, the processes of the present invention are self-optimizing with respect to microbial types and populations.

The biofilter consisted of an approximately 8-foot wide, 16-foot long, and 9-foot high, rectangular, 304 stainless-steel vessel. The biofilter was initially packed with a mixture of composted poultry litter, chopped kenaf (a bulking agent), and pelletized dolomitic limestone (a buffering agent) to a depth of approximately 6 feet. The packing rested on a stainless steel wire-mesh floor and 1.5 feet of void space was provided just above and below the packing. During the process of transporting the Demonstration Unit, the packing settled to a depth of approximately 5 feet, leaving approximately 2.5 feet of void space above the packing.

The Demonstration Unit was operated in two cycles: a TCE degradation cycle and a propane feeding cycle. During the TCE degradation cycle, contaminated water was pumped through the demonstration stripper while fresh air was drawn through the demonstration stripper and discharged into the biofilter.

The amount of time the system spent in each cycle was initially regulated with a series of timers. Later in the demonstration, the process was improved by the addition of a single multifunctional controller which took over the functions of the multiple timers and provided additional flexibility in operation, such as automatically changing the air flow rate during the TCE degradation and propane feeding cycles.

During the propane feeding cycle, the flow of water to the stripper was discontinued and a stream of propane was fed into the biofilter. Two feeding cycle operating modes were tested during the demonstration: a single pass mode and closed-loop recycle mode. When testing the single pass mode, a controlled amount of propane was injected into the biofilter influent air stream. The air/propane mixture flowed through the biofilter, where a portion of the propane was consumed, and the mixture was then discharged to the atmosphere via a 3-foot tall stack on top of the biofilter. When testing the closed-loop recycle feeding mode, the biofilter was isolated from the stripper and atmosphere using a series of electronically controlled dampers. Once these dampers were properly positioned, the process was closed to the outside environment and the internal air within the biofiltration system was continuously recycled on a closed-loop basis. A small amount of propane was fed into the closed biofiltration system during at least a portion of the closed-loop recycle mode of operation to feed the microorganisms and activate the necessary enzymes for contaminant degradation.

The propane was fed from a commercial 500-gallon tank through ½-inch copper tubing. The rate of propane flow into the air stream was controlled with a mass flow controller equipped with control valve. A lower explosion limit (LEL) sensor located inside the influent air ductwork and an associated control loop connected to a solenoid valve on the propane feed line ensured that only non-flammable propane-air mixtures entered the biofilter. Additional safeguards were provided by installing control loops between the propane feed shut-off solenoid valve and the air velocity sensor and air blower controller so that propane feed would automatically shut off if the air blower failed or if the air rate fell to a specified level. Additionally, the pressure regulator on the propane tank was set so that the maximum flow through the propane automatic control valve open at 100% would only slightly exceed the set point of the propane flow controller.

With implementation of closed-loop recycle feeding, it became necessary to develop a different propane-addition scheme than was used during the simple, continuous one-pass flow used without recycle. A feeding scheme was needed that would allow the closed system to be charged with as much propane (up to safe levels) in as short a period as possible to maximize consumption and also allow time for complete depletion of the propane from the packing before reintroduction of TCE. To accomplish this with the simplified recycle system implemented, propane addition was carried out stepwise with timers which provided intermittent flow of propane in a repeated on-off fashion (e.g., 1 minute on, 1 minute off, and so on) to ramp the concentration up until the propane in the closed system reached sufficiently high but safe concentrations at which time the propane feed was discontinued and the air allowed to recirculate in the closed system for the remainder of the cycle to complete consumption of the propane. Propane addition may commence at the very beginning of the closed-loop recycle phase or delayed to a chosen point within the recycle phase depending on other operating conditions and chosen or dictated performance/cost requirements.

Throughout the demonstration, the biofilter packing was kept moist by periodically pumping small amounts of water through a weeping type hose arranged over the surface of the packing. During most operating periods, the high humidity of the stripper effluent air was sufficient to maintain the proper moisture levels. However, if moisture addition became necessary (e.g., during hot weather periods with high air rates and short periods of stripper operation), then water was obtained from the site's purified water source. Moisture addition was controlled to minimize or preclude drainage into the void area at the bottom of the biofilter.

The object of this field demonstration was to evaluate the efficacy of this biofilter process for destroying TCE and other chlorinated compounds in contaminated air streams emitted from operations such as groundwater air stripping and solvent degreasing and to obtain information for scale up to commercial applications. This involved determining the effects of process variables on biofilter performance parameters such as contaminant removal efficiency, contaminate removal rate, and operation costs. On-line, real-time process monitoring was conducted by use of a gas chromatograph (GC), data loggers, a computer, and associated equipment located adjacent to the biofilter in a portable trailer. The GC was equipped with an electron capture detector (ECD), a flame ionization detector (FID), a column splitter, and a 10-way Valco valve to allow simultaneous analysis of both chlorinated aliphatic compounds and propane. Vacuum pumps and automated valves provided continuous flows of influent and effluent process gases to the GC which automatically sampled the processes gases every 30 or 60 minutes and in some cases every 4 minutes (e.g., when calibrating the GC and process equipment or when setting process feed rates). Data loggers collected and stored process data such as air flow rates, water flow rates, propane flow rates, propane concentrations (% of LEL), ambient and process stream temperatures, and oxygen concentrations. The GC and data loggers were coupled to a computer which was connected via modem to a computer at TVA in Muscle Shoals, Ala. Remote operation software was used to provide remote real time monitoring, downloading of process data, and control of some data logger and GC functions.

This description of this field demonstration example is given by way of illustration only and is not intended to limit the scope of the invention. Certain modifications and variations to the concept described by this specific example will occur to those skilled in the art which are within the true scope and spirit of the invention.

Example 2

Several parameters of the process of the present invention in general as well as some parameters unique to the closed-loop recycle feeding period significantly affect the operation, efficacy, economics, and performance of this biofilter process. The operating parameters and their approximate corresponding ranges as practiced in the Demonstration of Example 1, supra, are shown in Table 1 and refer to a cometabolism process. However, these ranges are given by way of illustration only and are not intended to limit or restrict the scope of the present invention so as to exclude operating ranges outside the ranges in the Demonstration of Example I or outside the ranges for direct metabolism processes. Explanation of process operating parameters in Table 1 follows.

Closed-loop recycle refers to the mode of operation used during the feeding cycle when the process was not receiving the contaminated air stream. "Yes" indicates that the process was operated in the closed-loop recycle mode and "no" indicates that the process was operated in a single-pass mode with no recycle.

Influent TCE load is the mass rate of TCE in the biofilter influent air in grams of TCE per day per cubic meter of packing volume.

Influent TCE concentration is the TCE concentration in the influent air fed to the biofilter in parts per million by volume (ppmv).

Propane feed rate is the rate of propane flow rate to fed to the biofilter.

Propane feed on interval is the period of time that the propane flow was intermittently in the "on" position such that propane was flowing to the process during the intermittent propane flow period in which the propane concentration within the internal process gas was ramped up during closed-loop recycle.

Propane feed off interval is the period of time that the propane flow was intermittently in the "off" position such that propane was not flowing to the process during the intermittent propane flow period in which the propane concentration within the internal process gas was ramped up during closed-loop recycle.

TABLE 1

Process Parameters and Operating Ranges During Demonstration of Example I

| | |
|---|---|
| Closed-loop (closed-system) recycle, yes or no | yes or no |
| Influent TCE load, g/day/m$^3$ packing | 0.3–19.6 |
| Influent TCE Concentration, ppmv | 2–92 |
| Propane feed rate, L/day/m$^3$ packing | 0–1000 |
| Propane feed on interval, minutes | 1 |
| Propane feed off interval, minutes | 1–10 |
| Propane feed duration, minutes/day | 30–600 |
| Propane feed concentration, volume % | 0–1.8 |
| Propane concentration at start of TCE cycle, volume % | 0–1.8 |
| Propane concentration at end of TCE cycle, volume % | 0–1.8 |
| Presence of propane in TCE cycle, yes/no | yes and no |
| Extent of propane presence during TCE cycle, minutes | 0–180 |
| Extent of propane presence during TCE cycle, % of TCE cycle duration | 0–100 |
| TCE degradation period, hours | 1–6 |
| Closed-loop recycle period, hours | 3–8 |
| Operating Temperature, ° F. | 40–106 |
| Empty Bed Contact Time, minutes | 7–54 |
| TCE:recycle time ratio | 0.25–1 |
| Oxygen concentration, volume % | 15–21 |

Propane feed duration is the period of time in which continuous or intermittent propane flow was fed to the process.

Propane feed concentration is the concentration of propane in the influent air fed to the process.

Propane concentration at start of TCE cycle is the propane concentration in the recirculating internal process gas when the closed-loop recycle period ends and the TCE degradation cycle begins. For the case of single-pass operation during the feeding cycle, it is the propane concentration in the influent air fed to the biofilter.

Propane concentration at end of TCE cycle is the concentration in the influent contaminated air being fed to the process when the TCE degradation cycle ends and the closed-loop recycle feeding period begins. In preferred operation, this concentration is zero during the entire TCE degradation cycle to preclude to co-mingling of the primary substrate with the contaminant.

Presence of propane in TCE cycle refers to whether or not propane is present internally in the process gas at the end of the propane feeding cycle and at the beginning or during any part of the TCE degradation cycle.

Extent of propane presence during TCE cycle in minutes is the duration in which propane is present during the TCE degradation cycle. This is preferably zero.

Extent of propane presence during TCE cycle in % of TCE cycle is the percent of the total TCE degradation cycle time period in which propane is present during the TCE degradation cycle.

TCE degradation period is the period of time in which the process is operated in the TCE degradation cycle.

Closed-loop recycle period is the period of time in which the process is operated in the closed-loop (closed process system) recycle mode.

Operating temperature is the temperature of the air entering or leaving the biofilter. The minimum temperature listed in Table 1 is the minimum temperature of the influent air to the biofilter, and the maximum temperature is the maximum temperature of the effluent air from the biofilter. Generally, effluent temperatures were slightly higher than influent temperatures.

Empty bed contact time (EBCT) is the period of time that the influent air would reside (residence time) in the biofilter packing during the TCE degradation cycle if the biofilter contained no packing. This parameter is often used because the void space within different packings varies, and the EBCT yields a standard estimation of the total volume of the packing in the bed and thus is directly related to the size (and cost) of the biofilter.

TCE:Recycle time ratio is the ratio of the TCE degradation period to the closed-loop recycle period.

Oxygen concentration is the concentration of oxygen in the process gas leaving the biofilter during single-pass operation or the concentration of oxygen in the internally recirculated process gas during closed-loop recycle operation.

Example 3

Process performance and economics were dramatically improved by modifying the Demonstration Unit to provide closed-loop recycle during the feeding cycle when the process was not receiving contaminated air.
For Example:

propane use and cost decreased by an average of 96%

TCE degradation efficiency increased from an average of 47% to as high as 100%

TCE degradation rate increased by an average of nearly 600%

A return to single-pass operation during the feeding cycle reduced degradation efficiency from 99% to 37%. Obviously, propane use and cost is much lower with closed-loop recycle during feeding because all of the propane is kept within the system and consumed, whereas with single-pass operation during the feeding cycle, the vast majority of the propane cannot be consumed as it passes once through the system and is released to the environment. Early attempts without closed-loop recycle to lower propane concentration or rate in an effort to increase the proportion of propane consumed and to decrease the proportion released to the environment resulted in lower biofilter performance levels.

Figure 2:
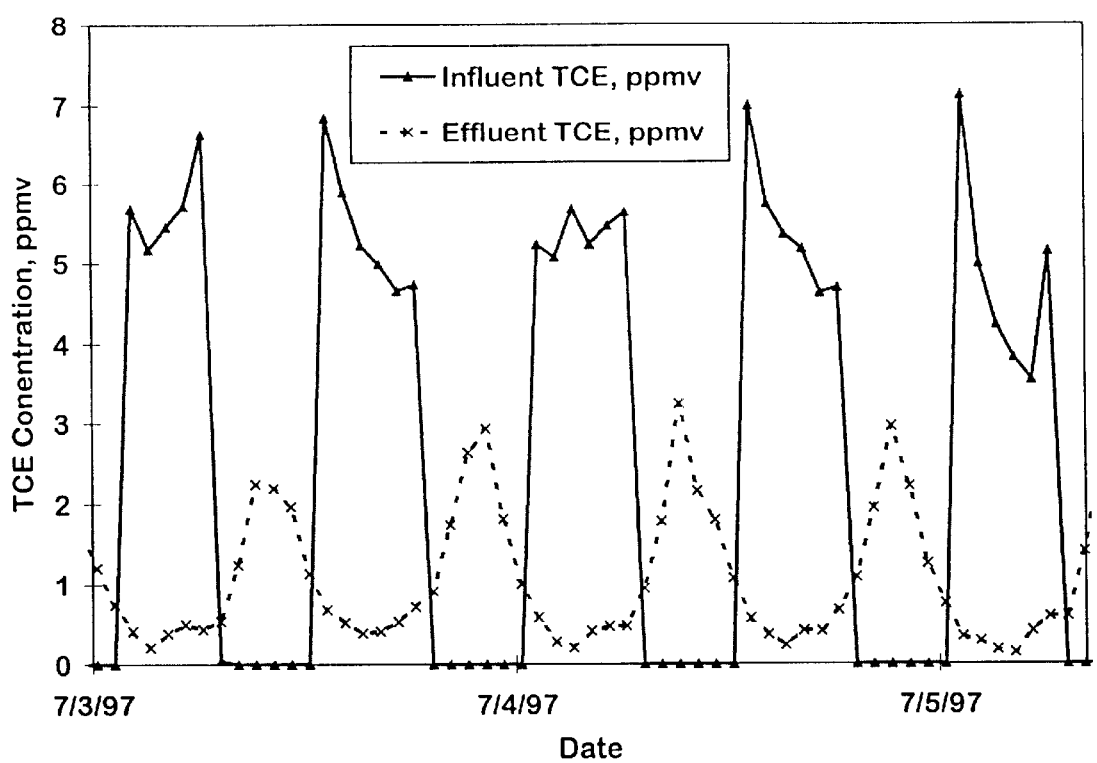
FIG. 2 shows: Demonstration Unit Operation without Closed-Loop Recycle Feeding.
Figure 3:
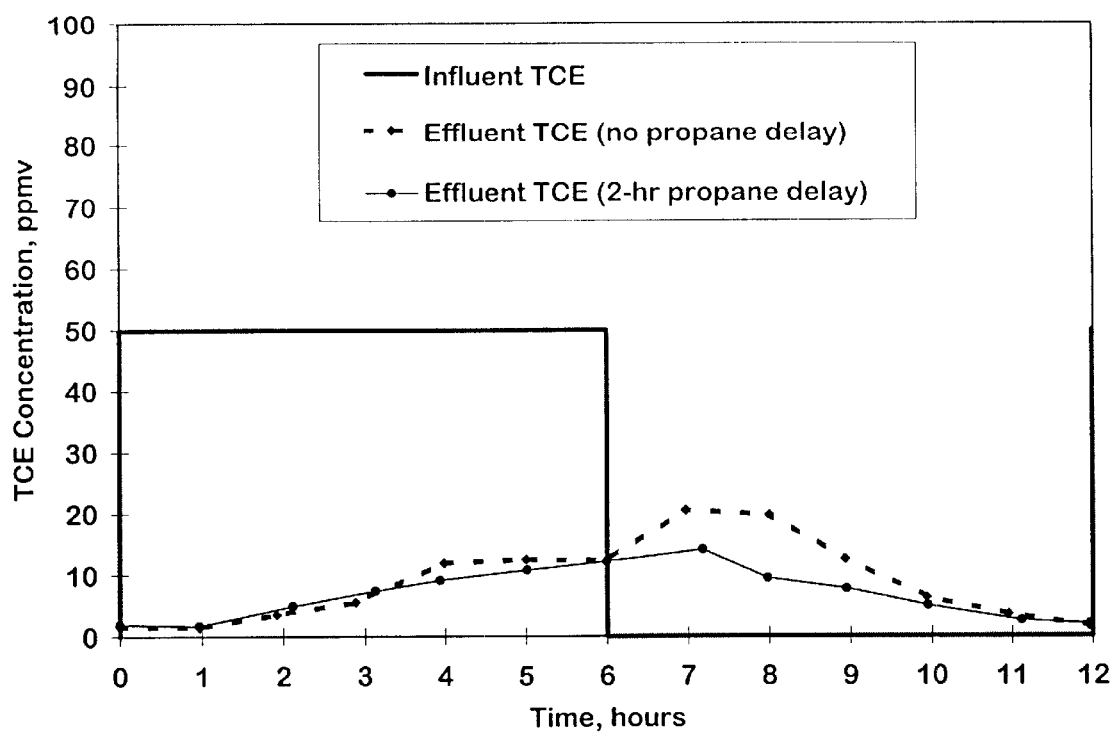
FIG. 3 shows: Effect of Delaying Start of Propane Feed in TVA Bench-Scale Biofilter.
Figure 4:
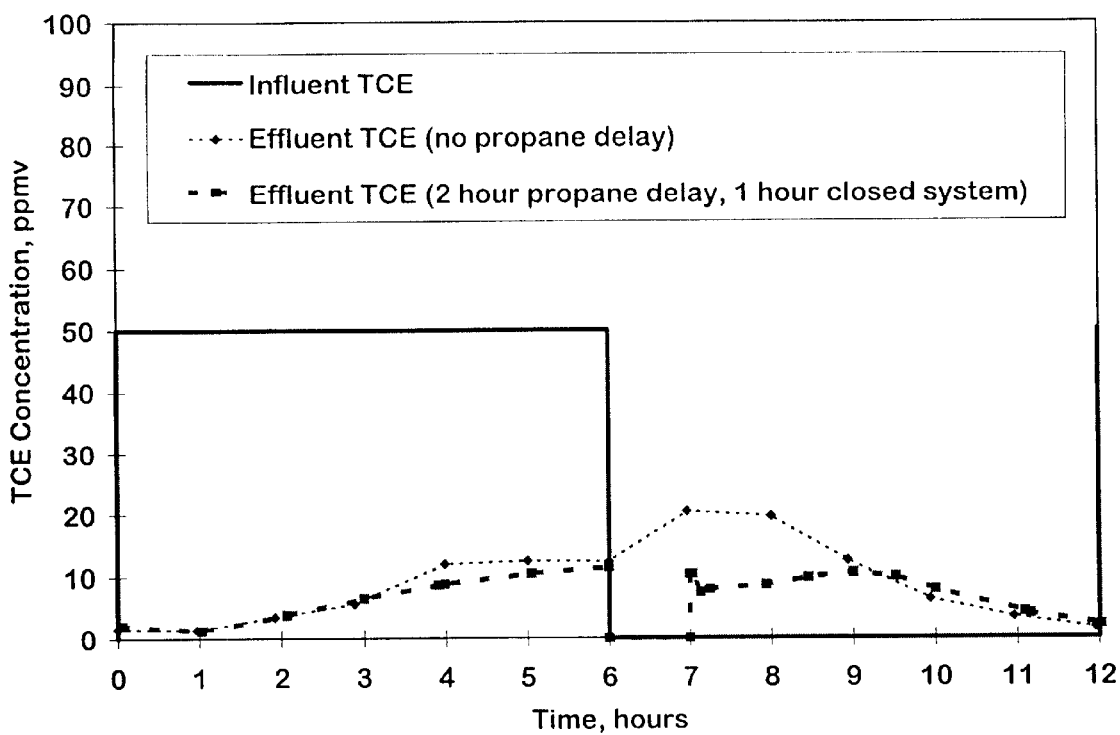
FIG. 4 shows: Effect of Closed System Operation During Part of Feeding Cycle.
Figure 5:
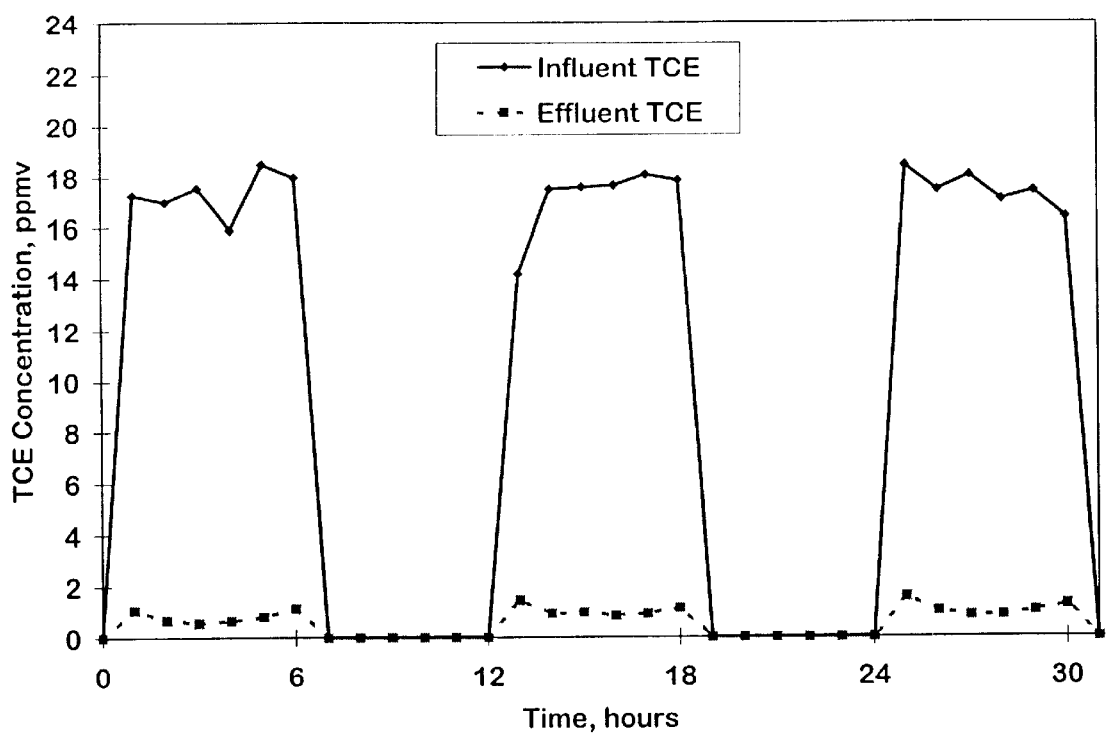
FIG. 5 shows: Zero Effluent TCE and 100% Propane Utilization During Closed-Loop Recycle.

Another more subtle but substantial advantage of the closed-loop recycle process scheme is that during the closed-loop feeding cycle, TCE adsorbed in the biofilter packing during the TCE degradation cycle is also destroyed, so that when TCE is again introduced to the biofilter after feeding, the level of adsorbed TCE in the packing is lower; thus, the packing has more capacity to remove TCE through a combination of adsorption and degradation. Without the closed-loop recycle scheme, the TCE adsorbed in the packing and not yet destroyed by microorganisms during the TCE degradation cycle was desorbed from the packing and released to the environment when the propane feeding cycle began. In tests without closed-loop recycle during feeding (single-pass mode), this resulted in higher effluent TCE concentrations during the propane feeding cycle (when the process was not receiving TCE) than during the TCE cycle (when the process was receiving TCE), as is shown in FIG. 2. Thus, the apparent TCE degradation efficiency and rate during the TCE cycle appeared to be very high, but when the TCE released during the propane feed cycle was included in the overall material balance on influent and effluent TCE for the system, the realized TCE degradation efficiency (and rate) was much lower. Some improvement in single-pass feeding was obtained in earlier bench-scale work as shown in FIG. 3 by delaying the start of propane feed and/or by ceasing propane feed early during the feeding cycle, to reduce or eliminate presence of propane in the system during the TCE cycle and to reduce or eliminate adsorbed TCE during propane feeding. However, the improvement was insufficient and still wasted propane, and it was recognized that a change in process scheme was necessary to: (1) eliminate TCE emissions during propane feeding and (2) consume all propane fed to the biofilter. In earlier bench-scale work, improvement through such a scheme during part of the propane feeding cycle (TCE-off cycle) was verified as shown in FIG. 4. However, what was recognized as essential was a process scheme to completely eliminate all TCE emissions during the full propane feeding cycle and to ensure complete consumption and no waste of propane, as shown in FIG. 5 after implementation of closed-loop recycle in the Demonstration Unit.

The improvement due to the closed-loop recycle scheme became more apparent earlier in the Demonstration than was foreseen, so the decision was made to implement a simpler form of recycle than had first been envisioned. Originally, it was envisioned that closed-loop recycle during feeding would involve control loops (added cost) to vent some process gas and add makeup air to provide sufficient oxygen, to prevent build up of carbon dioxide, and to add propane and maintain propane concentration at optimum levels until near the end of the feed cycle, when propane feed would be discontinued and the microorganisms would be allowed to complete consumption of all available propane before TCE was reintroduced. Presence of propane during introduction of TCE results in low performance because the microorganisms consume propane in favor degrading TCE, and adsorbed TCE is desorbed and emitted to the environment. The simpler form of recycle provided only for charging of the closed biofilter system with propane and then recirculating of the in-system process gas until the propane was depleted and did not provide for the propane and oxygen control loops and the venting and make up streams earlier envisioned as necessary. The simpler scheme was inexpensive. It was believed at the time that the simpler scheme would not be optimal but would show whether or not the scheme was effective. Scientific wisdom indicates that this simpler closed-loop recycle scheme would eventually result in process failure because when the closed biofilter system is charged with propane up to the safe concentration and the process gas is then allowed to recirculate in the closed system until all of the propane is consumed, the oxygen demand that exists for the propane alone dictates that the oxygen supply should be depleted, resulting in the death of the aerobic microorganisms. Unexpectedly, it was discovered that the oxygen levels within the closed system were reduced only slightly, which defies conventional scientific wisdom concerning the function of these aerobic microorganisms, and the simpler recycle system dramatically improved performance as shown in FIG. 5.

Example 4

Figure 6:
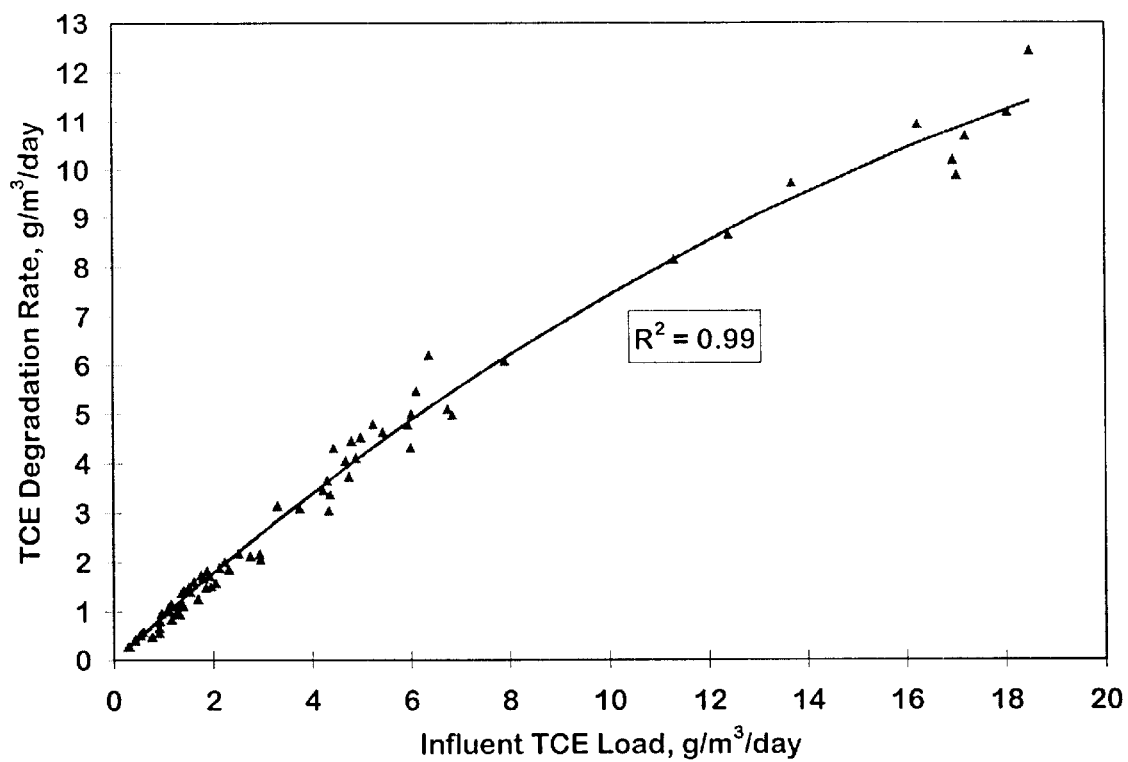
FIG. 6 shows: Effect of Load on Degradation Rate in Demonstration Unit.

FIG. 6 shows that the influent TCE load had a significant but predictable effect on TCE degradation rate.

Figure 7:
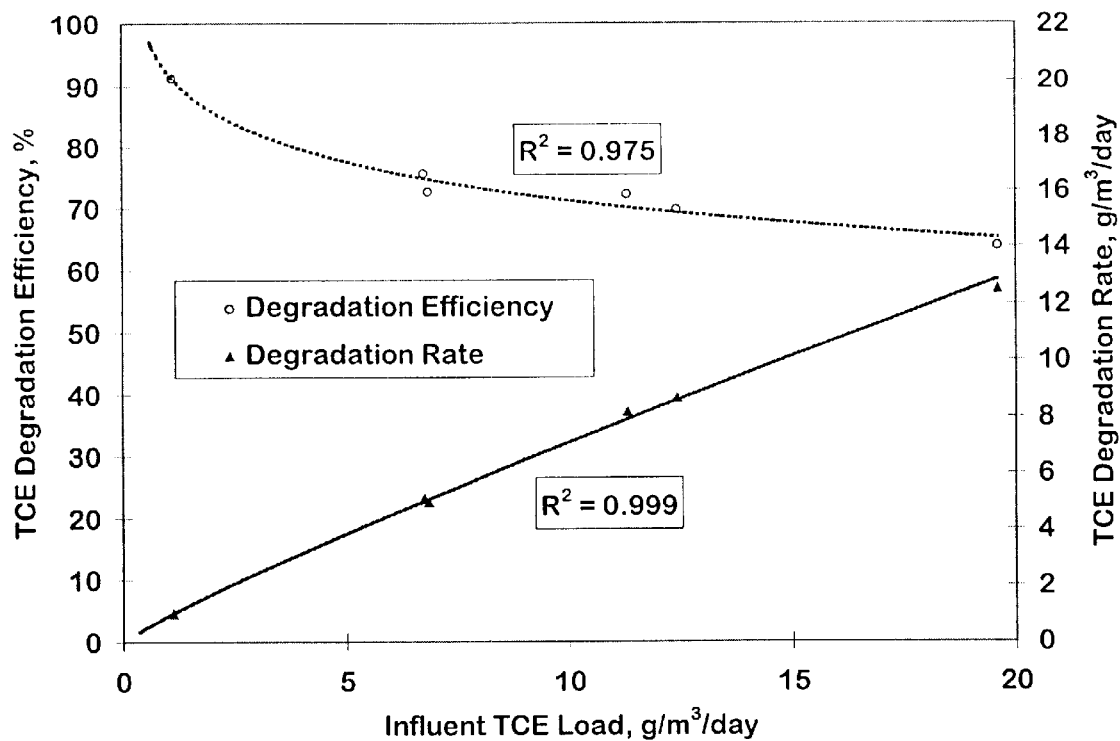
FIG. 7 shows: Effect of Influent Load on Degradation Rate and Efficiency in Demonstration Unit with EBCT=30 Minutes.

However, the degradation rate alone does not fully describe biofilter performance because it does not take into account the degradation efficiency, which is a measure of the proportion of the influent TCE that the biofilter destroys. Degradation efficiency is displayed along with degradation rate in FIG. 7 and can be seen to vary inversely with degradation rate. In other words, as the rate of TCE fed to the biofilter increases, the degradation efficiency decreases and the degradation rate increases. Increasing the TCE degradation efficiency requirement decreases the TCE load and degradation rate that the biofilter is capable of handling and therefore increases the size of the biofilter. For example, a TCE biofilter could be designed to achieve a high degradation rate but with a degradation efficiency of only 50%, which, depending on site requirements, may or may not be acceptable. If it is required for a specific application that a biofilter system meet only a specific effluent TCE concentration, and if a 50% removal efficiency will meet this requirement, designing the biofilter (and manipulating the waste stream if applicable) to maximize degradation rate would be most cost effective by minimizing biofilter size.

Example 5

Figure 8:
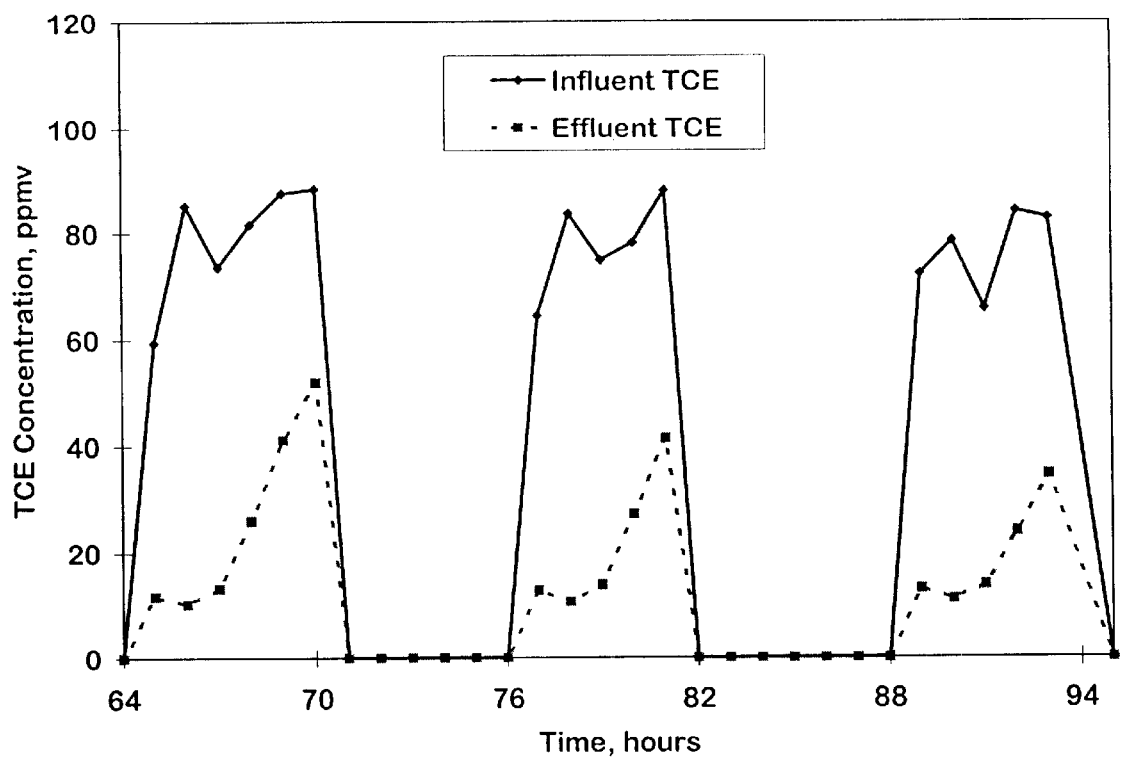
FIG. 8 shows: Effect of Breakthrough on Effluent Concentration in Demonstration Unit.

It was originally envisioned that a TCE Biofilter process would consist of two biofilters—one receiving the waste stream while the other was in closed-loop recycle feeding mode. When the feeding cycle was complete, the freshly fed biofilter would then begin to receive the waste stream and the other biofilter would be set to begin the closed-loop recycle feeding mode. During the course of the Demonstration, it was observed that when testing shorter EBCTs in an effort to decrease biofilter size, the effluent TCE concentration would at some point during the TCE cycle begin to increase more rapidly as shown in FIG. 8, indicating "break through" of the TCE waste stream. At that point, the adsorption and degradation capacity of the bio-degradation media (packing) had been surpassed. In other words, up to that point, adsorption and degradation of TCE within the packing had prevented high effluent TCE concentrations because the waste stream train had not yet reached the top of the packing, but as the TCE air stream traveled through the biofilter packing and reached the top of the packing, higher effluent concentrations developed due to break through, because the packing's adsorption and degradation rate capacities at those process conditions were less than the rate of TCE being fed to the biofilter.

Results suggested that the degradation efficiency could be improved and the effluent TCE concentration could be reduced by shortening the length of the TCE degradation cycle relative to the closed-loop recycle feeding period. It was reasoned that this would prevent breakthrough during the TCE cycle, allow more time for microbial degradation of TCE during closed-loop recycle, and provide more adsorption capacity and TCE degradation enzymes for the next TCE cycle. Of course, shortening the TCE cycle relative to the recycle feeding period was expected to require more than two biofilters. For example, with a TCE degradation period of 2 hours and a closed-loop recycle feeding period of 4 hours, three biofilters would be needed so that one biofilter would always be available for receiving the continuous waste stream—that is, if the waste stream is continuous. In some applications such as solvent degreasing, the gaseous waste stream is only continuous at certain times of the day. In such situations, it was reasoned that there might be a need for only one biofilter, if the time available for feeding and degradation of adsorbed TCE was sufficient to meet site performance requirements during the intermittent periods of flow of the waste stream to the biofilter. In addition, since the current groundwater air stripping systems at the decontamination site have sumps which collect the groundwater for pumping to the air strippers, we believed that only a single biofilter would be required if the existing or designed sump capacity would allow a surge volume (storage of incoming groundwater) that would allow pumping of the groundwater to the strippers at twice the normal continuous groundwater flow rate for only half of the time. For example, if incoming groundwater at 20 gallons per minute could be allowed to flow into a sump or other collection vessel and stored for 4 hours (total of 4800 gallons) during the single biofilter's recycle feed period, the groundwater could then be pumped to an air stripper at 40 gallons per minute for the next 4 hours (total of 9600 gallons to remove the stored and the incoming water) and the resulting contaminated air stream could be fed to the biofilter for the 4-hour TCE cycle. If the existing stripper parameters or design parameters of a new stripper are such that the 40-gallon-per-minute water flow rate could produce a contaminated air stream of the same volumetric flow rate but at twice the concentration, rather than twice the air rate at the same concentration, the design size and cost of the biofilter generally would be lower than a two-biofilter system for continuous air stripping. For a given TCE load (dictated by site or application), the biofilter design size and cost and the cost per unit of pollutant destroyed generally decreases with increase in the concentration and with decrease in the flow rate of the waste stream. Thus, the biofilter capital and operating costs would be lower for operating one biofilter instead of two. For an application in which the waste stream is already in the gas phase and flow is continuous, a single biofilter system would still be possible using an air compressor and a pressurized air storage tank to store the waste gas during the recycle feeding period and then to feed the contaminated air to the biofilter at a higher flow rate only during the TCE cycle.

Indeed, decreasing the TCE cycle time relative to the closed-loop recycle feeding time in an attempt to avoid TCE break through yielded results we expected, as shown in Table 2. Decreasing the TCE:recycle time ratio increases the water or gas storage capacity required, but it increased the degradation efficiency and decreased the effluent TCE concentration, albeit at the expense of degradation rate, which decreased. A decrease in degradation rate would normally indicate an increase in the volume (size and cost) of the biofilter for a site/application-specific air rate and concentration. However, this does not take into account the advantage in decreased biofilter size and cost that can be achieved by manipulating the waste stream so as to produce a lower volume, higher concentration air stream for a given TCE load (constant for site), if this flexibility exists.

TABLE 2

Effect of TCE:Recycle Time Ratio

| TCE:Recycle Time Ratio, hr:hr | Average TCE Degradation Efficiency, % | Average Effluent TCE Concentration, ppmv | Average TCE Degradation Rate, g/day/m packing |
|---|---|---|---|
| 4:4 | 69 | 17.8 | 9.8 |
| 4:8 | 84 | 4.5 | 3.8 |

TABLE 2-continued

Effect of TCE:Recycle Time Ratio

| TCE:Recycle Time Ratio, hr:hr | Average TCE Degradation Efficiency, % | Average Effluent TCE Concentration, ppmv | Average TCE Degradation Rate, g/day/m packing |
|---|---|---|---|
| 2:4 | 98 | 0.4 | 3.1 |
| 2:6 | 98 | 0.6 | 2.7 |
| 1:3 | 98 | 0.2 | 1.0 |

Example 6

In order for those skilled in the art to better understand the concepts of the present invention, the following working examples for both cometabolic processes and directly metabolic processes are hereby given and explained as specific examples of actual process operating parameters and the resulting process performance achieved during field operation of the Demonstration Unit as described in detail in Examples 1 and 2. These operating parameters are simply specific examples of the process parameters for cometabolic or directly metabolic processes that were used during operation of the Demonstration Unit of Example 1 to achieve a specific process performance and are given here simply as one specific example of the process performance obtained while practicing a specific set of process operating conditions and are in no way intended to limit the scope and spirit of this invention to those particular values. The process equipment and operation methods used to achieve the process performance results of the following specific example are also described in detail in Example 1. The specific process operating parameters and the resulting process performance achieved are shown in the tables below:

Specific Process Parameter Values and Resulting Process Performance Values for TCE Cometabolic Degradation via Propane as Primary Substrate

PROCESS PARAMETERS

| | |
|---|---|
| Closed-loop recycle system, yes or no | yes |
| Influent TCE load, g/day/m³ packing | 6.4 |
| Influent TCE Concentration, ppmv | 37 |
| Propane feed rate, L gas/day | 1875 |
| Propane feed on interval, minutes | 1 |
| Propane feed off interval, minutes | 1 |
| Propane feed duration, minutes/day | 240 |
| Propane feed concentration, volume % | 0–1.5 |
| Propane concentration at start of TCE cycle, volume % | 0 |
| Propane concentration at end of TCE cycle, volume % | 0 |
| Presence of propane in TCE cycle, yes/no | no |
| Extent of propane presence during TCE cycle, minutes/day | 0 |
| Extent of propane presence during TCE cycle, % of TCE cycle duration | 0 |
| TCE degradation period, hours | 2 |
| Closed-loop recycle period, hours | 4 |
| Operating temperature, ° F. | 82 |
| TCE Cycle Empty bed contact time, minutes | 15 |
| TCE:recycle time ratio (2 hours:4 hours) | 0.5 |
| Oxygen concentration, volume % | 18–21 |

PROCESS PERFORMANCE

| | |
|---|---|
| Degradation Efficiency, % | 97 |
| Degradation Rate, g/day/m³ packing | 6.2 |
| Effluent TCE Concentration, ppmv | 0.9 |

Specific Process Parameter Values and Resulting Process Performance Values for Degradation of Propane (or Other Amenable Compounds) via Direct Metabolism

PROCESS PARAMETERS

| | |
|---|---|
| Closed-loop recycle system, yes or no | yes |
| Propane feed rate, L gas/day | 1875 |
| Propane feed load, g/day | 3374 |
| Propane feed on interval, minutes | 1 |
| Propane feed off interval, minutes | 1 |
| Propane feed duration, minutes/day | 240 |
| Propane feed concentration, volume % | 0–1.5 |
| Propane feed concentration, ppmv | 0–15,000 |
| Closed-loop recycle period, minutes | 240 |
| Closed-loop empty bed contact time, minutes | 4 |
| Open-loop fresh air single pass purge period, minutes | 4 |
| Open-loop fresh air single pass empty bed contact time, minutes | 4 |
| Operating temperature, ° F. | 82 |
| Oxygen concentration, volume % | 18–21 |

PROCESS PERFORMANCE

| | |
|---|---|
| Degradation Efficiency, % | 100 |
| Degradation Rate, g/day | 3374 |
| Effluent Propane Concentration, ppmv | 0 |

Those of ordinary skill in the art will appreciate that the values in the above tables for cometabolism and direct metabolism processes are within the operating ranges of this invention but are not necessarily optimum values. Further, those of ordinary skill in the art will appreciate that the values in the above table for direct metabolism of propane can be varied to higher process flow rates, concentrations, and influent pollutant loads with resulting higher process efficiencies and degradation rates for a wide variety of other pollutants that can be biodegraded by direct metabolism more easily than propane, such as alcohols, esters, ethers, ketones, aromatics, and so forth, as described, supra.

Example 7

The processes of the present invention, particularly for decontaminating gaseous waste streams, can also be operated without any packing or support media for the microorganisms. Using this process scheme, the microorganisms are contacted with the contaminated stream by recirculating a fluid nutrient-microorganism suspension spray through the biofilter or bioreactor on a closed-loop basis. This process scheme is more advantageous for use with a wide variety of pollutants that have higher water solubilities and lower gas-liquid partition coefficients (Henry's Law Constants), i.e. that have greater tendency to transfer to and/or remain in the liquid phase, where biodegradation occurs. Such pollutants include a wide variety of alcohols, ketones, esters, ethers, ammonia, hydrogen sulfide, and many others. The fluid nutrient-microorganism suspension is recirculated through the process via spray nozzles at rates sufficient to obtain a spray or mist of the microorganism suspension so as to produce more liquid surface area for transfer of the pollutants from gas to liquid phase, as will be appreciated by those or ordinary skill in the art. The results obtained using this process scheme are similar to those obtained and shown in the tables of Example 6, supra.

INVENTION PARAMETERS

After sifting and winnowing through the data, supra, as well as other results and operations of our new and novel processes, including methods and means for the effecting thereof, the process operating parameters for carrying out our invention for cometabolism processes are summarized in Table 4, below, and for carrying out our invention for direct metabolism processes are summarized in Table 5, below, with their corresponding operating range limits for the present invention. The process parameters can be varied in an empirical fashion to achieve the maximum process performance and economics as desired in accordance with the present invention. At present, we believe the significant process parameters are those shown in Tables 4 and 5 based on the results of the Demonstration Unit described in the Examples. We further believe that the process parameters of the present invention can be varied within the ranges shown in Tables 4 and 5. Explanation of the process operating parameters in Table 4 were described in Example 2 for Table 1, supra. In the Demonstration Unit described in the Examples, TCE and propane were used as the contaminant and primary substrate, respectively, and are shown as invention process parameters in Table 4 for illustrative purposes and are not intended to be limiting as the contaminant and primary substrate for the purposes of the present invention, as the processes of the present invention may be practiced with other contaminants and other primary substrates as discussed, supra, or with contaminants which can be directly metabolized as a food and growth source by naturally occurring microorganisms as explained, supra, without the need for a cometabolism step, as shown in Table 5. For pollutants capable of degradation by direct metabolism, the cometabolism cycle (e.g. the TCE cycle in Table 4) is eliminated, and most values for propane in Table 4 correspond to pollutants degradable by direct metabolism shown in Table 5, such as benzene, toluene, xylenes, methyl ethyl ketone and other ketones, methyl alcohol and other alcohols, butyl acetate and other esters, methyl tertiary butyl ether and other ethers, ammonia, hydrogen sulfide, carbon disulfide, and a wide variety of pollutants or other undesirable compounds that can be directly metabolized by naturally occurring microorganisms.

For some process variables in Tables 4 an 5, the operating ranges given in the provisional application shown in Table 6 below were somewhat narrower than given in the non-provisional application of the present invention. However, we believe that, while these narrower process parameter ranges in Table 6 are preferred operating ranges, the most preferred operating ranges are given in Tables 4 and 5.

TABLE 4

Process Parameters and Operating Ranges for Cometabolism Processes

| | |
|---|---|
| Closed-loop recycle system, yes or no | yes or no |
| Influent TCE (or other target pollutant) load, g/day/m$^3$ packing | 0–1000 |
| Influent TCE (or other target pollutant) concentration, ppmv (in gas stream) | 0.001–10,000 |
| Propane or other food source feed rate, L gas/day/m$^3$ packing | 0.1–20,000 |
| Propane feed on interval, minutes | 0.01–1440 |
| Propane feed off interval, minutes | 0.01–1440 |
| Propane feed duration, minutes/day | 0.01–1440 |
| Propane feed concentration, volume % | 0–2.1 |
| Propane concentration at start of TCE cycle, volume % | 0–2.1 |
| Propane concentration at end of TCE cycle, volume % | 0–2.1 |
| Presence of propane in TCE cycle, yes/no | yes or no |
| Extent of propane presence during TCE cycle, minutes/day | 0–1440 |
| Extent of propane presence during TCE cycle, % of TCE cycle duration | 0–100 |
| TCE degradation period, hours | 0.02–720 |
| Closed-loop recycle period, hours | 0.02–720 |

TABLE 4-continued

Process Parameters and Operating Ranges for Cometabolism Processes

| | |
|---|---|
| Operating temperature, ° F. | 33–140 |
| Empty bed contact time, minutes | 0.1–1440 |
| TCE:recycle time ratio | 0.001–1000 |
| Oxygen concentration, volume % | 0–22 |

TABLE 5

Process Parameters and Operating Ranges for Direct Metabolism Processes

| | |
|---|---|
| Closed-loop recycle system, yes or no | yes or no |
| Pollutant load, g/day/m$^3$ packing | 0–50,000 |
| Pollutant concentration, ppmv (in gas stream) | 0.001–20,000 |
| Pollutant feed on interval, minutes | 0.01–1440 |
| Pollutant feed off interval, minutes | 0.01–1440 |
| Pollutant feed duration, minutes/day | 0.01–1440 |
| Closed-loop recycle period, hours | 0.02–720 |
| Operating temperature, ° F. | 33–140 |
| Empty bed contact time, minutes | 0.02–1440 |
| Oxygen concentration, volume % | 0–22 |

TABLE 6

Process Parameters and Operating Ranges in Provisional Application

| | |
|---|---|
| Closed-system recycle, yes or no | yes or no |
| Influent TCE load, g/day/m$^3$ packing | 0–400 |
| Influent TCE Concentration, ppmv | 0.001–10,000 |
| Propane feed rate, L/day/m$^3$ packing | 0.1–20,000 |
| Propane feed on interval, minutes | 0.01–1440 |
| Propane feed off interval, minutes | 0.01–1440 |
| Propane feed duration, minutes/day | 0.01–1440 |
| Propane feed concentration, volume % | 0–2.1 |
| Propane concentration at start of TCE cycle, volume % | 0–2.1 |
| Propane concentration at end of TCE cycle, volume % | 0–2.1 |
| Presence of propane in TCE cycle, yes/no | yes or no |
| Extent of propane presence during TCE cycle, minutes/day | 0–1440 |
| Extent of propane presence during TCE cycle, % of TCE cycle duration | 0–100 |
| TCE degradation period, hours | 0.02–720 |
| Closed-loop recycle period, hours | 0.02–720 |
| Operating Temperature, ° F. | 33–140 |
| Residence time (empty bed contact time), minutes | 1–1440 |
| TCE:recycle time ratio | 0.001–1000 |
| Oxygen concentration, volume % | 0–22 |

In addition, and as previously discussed, supra, the processes of the present invention may be applied to detoxification of liquid contaminated streams by contaminant degradation directly in the contaminated liquid, as discussed in DESCRIPTION OF THE DRAWINGS, supra. Any contaminants in gas phase must first be transferred to liquid phase or dissolved into the liquid phase on or in the microorganisms before biodegradation or enzymatic degradation can occur. Therefore, if the contaminants already exist in liquid phase, there is no purpose in first transferring the contaminants to the gas phase, as was practiced by the air stripping step in the Demonstration Unit in the EXAMPLES, supra, when the resulting gas phase contaminants will simply have to be transferred back into the liquid phase on or into the microorganisms for degradation to occur. Following are some other important considerations concerning Table 4 and the practicing of the present invention.

Although temperature was not a controlled parameter in the Demonstration Unit, temperature is an important parameter and can be freely varied by one of ordinary skill in the art to optimize performance of the process so long as the microorganisms are not harmed. For example, the Demonstration Unit influent/effluent temperature range was 42 to 106° F., and we believe that temperatures substantially below and substantially above this range can be used so long as the considerations earlier discussed are heeded.

"Influent TCE load" is listed as zero (0) for those periods when the processes are in the primary substrate feeding cycle. We wish to make it clear that we believe the processes of the present invention function best when no TCE (or other degradable contaminant) is present during the primary substrate feeding cycle and no primary substrate is present during the TCE degradation cycle. However, the presence of some TCE in the feed cycle and some primary substrate in the TCE degradation cycle are not excluded, rather, this simply renders the present invention less efficient and is currently not preferred.

It is our current belief that TCE parameters which have any zero (0) value in Table 4 are best kept to a value on the order of about 0.01 (preferably less, of course), though the units in Table 4 will vary. We picked this value rather arbitrarily to express our belief that the absence of TCE in the propane feed cycle and the absence of propane during the TCE degradation cycle provide optimum process performance and economics.

With respect to "Influent TCE Concentration", we set this range rather broad to include what we expect would be values of commercial interest. At a concentration of less than about 0.001 ppmv, the stream is dilute to the extent that its treatment would probably be economically impractical. On the other hand, with respect to TCE concentration values greater than about 10,000, we believe that the same will seldom be encountered in the type of environments where we believe the process of the present invention will be most useful. However, in theory, operation at the extremes is feasible.

Obviously "Propane feed rate" will be influenced by other process parameters and operating ranges, and this should be apparent to one of ordinary skill in the art.

"Propane feed on interval" and "Propane feed off interval" reflect times during the propane feed cycle when propane is fed to the biofilter and when propane is not fed to the biofilter. These terms convert to six seconds to one day and reflect what we believe should include most practical operating times, but there is no theoretical reason of which we are aware why shorter and longer times could not be used given the mechanism of the process of the present invention. However, working at the extremes may not be economically desirable. Similar remarks apply to "Propane feed duration".

With respect to "Propane feed concentration" (volume % based on the carrier stream, typically air for gas phase operations, hereafter the same for all volume % values), the 0 volume % value is what we believe to be the most desirable value—the absence of propane—during the TCE degradation cycle. The upper limit is set by a very practical consideration, the lower explosive limit (LEL). The upper limit can vary depending on the primary substrate used and is set by safety factors. For example, for propane the LEL given in various sources is on the order of 2.2–2.4%, and for safety purposes the concentrations used in our work have typically been set to a maximum of 1.5%. Similar remarks apply to the "Propane concentration at start of TCE cycle" and "Propane concentration at end of TCE cycle".

With respect to "Presence of propane in TCE cycle, yes/no", "yes/no" refers to whether or not propane is present at the beginning or during the TCE cycle.

There are two recitations for "Extent of propane presence during TCE cycle", one in "minutes" and one in "%" of TCE cycle duration. From the earlier discussion, it will be apparent that we prefer that there be no propane present during the TCE degradation cycle, but again the presence of some propane is not excluded, it being understood that the greater the amount of propane present the less efficient the process of the present invention becomes.

The "TCE degradation period" simply refers to what we currently believe to be the probable minimum time and maximum time that TCE degradation will be conducted for most practical processes. Similar remarks apply to "Closed-loop recycle".

With respect to "Operating Temperature", generally the higher the temperature the more efficient the biofilter process of the present invention.

With respect to "Empty bed contact time" (EBCT) we selected this parameter since it is commonly used in the biofilter/bioreactor art as a means to characterize the effective residence time without being limited to packing of any particular size. For example, obviously spheres 1" in diameter will provide a different void volume (free space) than fine-grain sand when used in a biofilter/bioreactor. As is the case with other parameters, we selected EBCT to include what we think will be those most commonly used on a commercial basis.

With respect to "TCE: recycle time ratio", this reflects the TCE degradation cycle time period with respect to the feed cycle time period. Although it is unit-less, time will always be the same for each cycle (minutes, hours, etc.) so that the ratio has meaning. We selected a rather broad range for this ratio since it can vary greatly depending upon other process parameters chosen and process performance required. It is believed that one of ordinary skill in the art can easily appreciate how to balance the various factors involved in the processes of the present invention to select an appropriate TCE: recycle time ratio based on the process performance and economics required.

Finally, with respect to "Oxygen concentration", we set the lower limit as 0 to include the possibility of microsites of anaerobic bacteria existing in the biofilter. As a practical matter, however, we currently do not see an oxygen level of less than 0.001 volume % or even 0.01 volume % to be of commercial importance. We set the upper limit to approximate the oxygen concentration in air which we view as the practical supplier of oxygen to the microorganisms of the present invention. If one were to accept cost/dangers of increased oxygen levels, we see no reason why such increased oxygen levels could not be used.

We selected the mixture of composted poultry litter, pine bark, chopped kenaf, and pelletized dolomitic limestone for the biofilter packing primarily because of its low cost and its availability. Needless to say, for the reasons discussed herein, the exact nature of the packing is not overly important so long as process gases or liquids can flow through the packing without obstruction. The exact size of the various components of the mixture we used in the demonstration unit is not important so long as the contaminated stream and primary substrate stream can flow through the packing and contact the microorganisms therein.

Usually, the pH of the biodegradation media of the present invention is simply set within the neutral range of approximately pH of 5 to 8 since the microorganism used thrive within this range. The pH can an easily be set or adjusted by one of ordinary skill in the art.

Moisture level in the biodegradation media of the present invention is simply set so the microorganisms are healthy.

There is no need to add extra water if the amount present is sufficient for this purpose. This proper moisture level can easily be determined and controlled by one of ordinary skill in the art.

Packing particle size and depth are set to ensure a fairly even flow of the process streams through the packing without excessive resistance to flow. The more even the flow the better, but as one of ordinary skill in the art will appreciate with respect to many aspects of the present invention, this is a matter of degree, and one simply loses process efficiency with a more uneven flow through the packing.

While we have shown and described particular embodiments of our invention, modifications and variations thereof will occur to those skilled in the art. We wish it to be understood, therefore, that the appended claims are intended to cover such modifications and variations which are within the true spirit and scope of our invention.

What is claimed is:

1. A process for the treatment of at least one gas containing air or oxygen to aerobically biodegrade at least one compound contained in the gas by contacting the gas with at least one aerobic microorganism, whereby the at least one aerobic microorganism or at least one enzyme produced by the at least one aerobic microorganism aerobically biodegrades the at least one compound and lowers the concentration of the at least one compound to a desired lower concentration, the process comprising a biodegradation means which contains the at least one aerobic microorganism and/or the at least one enzyme produced by the at least one microorganism and a gas recirculation means in communication with the biodegradation means, which process comprises:

(a) feeding the gas into the biodegradation means,
   (b) closing the biodegradation means and recirculation means to the ambient atmosphere exterior to the process such that the gas is not mixed with the ambient atmosphere exterior to the process;
   (c) removing the gas from the biodegradation means by way of the recirculation means which is in communication with the biodegradation means;
   (d) recirculating the gas through the recirculation means to and through the biodegradation means to form a closed loop flow of the gas through the process to thereby intimately contact the gas with the at least one microorganism and/or the at least one enzyme produced by the at least one microorganism to effect aerobic biodegradation of the at least one compound, said aerobic biodegradation causing depletion of oxygen and causing the gas to reach oxygen concentrations substantially lower than normal ambient atmospheric conditions during substantially the entire process and said aerobic biodegradation causing reduction in the concentration of the at least one compound to a desired lower concentration;
   (e) opening the process to the ambient atmosphere exterior to the process and repeating steps (a) through (d).

2. The process of claim 1, wherein the at least one compound in the gas is directly metabolized by the at least one aerobic microorganism.

3. The process of claim 2, wherein the gas being treated is fed to the biodegradation means as a batch and removed from the biodegradation means as a batch.

4. The process of claim 2, wherein the gas fed to the process is contaminated air.

5. The process of claim 2, wherein the at least one compound is an organic compound.

6. The process of claim 2, wherein the at least one compound is an inorganic compound.

7. The process of claim 2, wherein the at least one compound is a volatile organic compound or a semi-volatile organic compound.

8. The process of claim 2, wherein the at least one compound is a chlorinated organic compound.

9. The process of claim 2, wherein multiple biodegradation means and recirculation means are used.

10. The process of claim 2, wherein the at least one aerobic microorganism and/or the at least one enzyme is supported on a packing material.

11. The process of claim 10, wherein the packing material is a sorbent material.

12. The process of claim 10, wherein the packing material comprises activated carbon.

13. The process of claim 10, wherein the at least one aerobic microorganism and/or the at least one enzyme is not supported on a packing material.

14. The process of claim 1, wherein subsequent to step (d) and prior to step (e) and in the substantial absence of the at least one compound, at least one primary substrate stream not from the ambient atmosphere exterior to the process and containing at least one primary substrate for the at least one aerobic microorganism is added to the biodegradation means and contacted with the at least one aerobic microorganism for a time sufficient and under conditions effective for the at least one primary substrate to feed the at least one aerobic microorganism and thereby effect production of the at least one enzyme, which the at least one enzyme effects cometabolic biodegradation of the at least one compound, said primary substrate being consumed within the process as it is added and after it is added.

15. The process of claim 14, wherein the at least one primary substrate and the gas containing the at least one compound are fed to the biodegradation means in the form of separate and discrete streams during separate and discrete process cycles, which include a primary substrate feeding cycle and a gas feeding cycle, one cycle alternating in succession with the other, such that the at least one primary substrate stream is fed to the biodegradation means part of the time to feed the at least one aerobic microorganism and effect production of the at least one enzyme which effects cometabolic biodegradation of the at least one compound, and the gas stream is fed to the biodegradation means a different part of the time to effect cometabolic biodegradation of the at least one compound as the gas containing the at least one compound contacts the at least one microorganism and the at least one enzyme in the biodegradation means.

16. The process of claim 15, wherein the gas being treated is fed to the biodegradation means as a batch and removed from the biodegradation means as a batch.

17. The process of claim 15, where during the gas feeding cycle of operation (a), the gas stream is continuously fed to the biodegradation means and continuously removed from the biodegradation means.

18. The process of claim 15, wherein the gas fed to the process is contaminated air.

19. The process of claim 16, wherein the time period for said opening of the process in operation (e) and feeding of said gas in operation (a) is 0.00278% to 99.997% of the entire process operation.

20. The process of claim 17, wherein the time period for said opening of the process in operation (e) and feeding of said gas in operation (a) is 0.00278% to 99.997% of the entire process operation.

21. The process of claim 15, wherein the at least one compound is an organic compound.

22. The process of claim 15, wherein the at least one compound is a volatile organic compound or a semi-volatile organic compound.

23. The process of claim 15, wherein the at least one primary substrate is an alkane compound or an aromatic compound.

24. The process of claim 15, wherein the at least one primary substrate is a phenolic compound.

25. The process of claim 15, wherein the at least one compound is a chlorinated organic compound.

26. The process of claim 15, wherein the at least one compound is a chlorinated aliphatic hydrocarbon compound.

27. The process of claim 15, wherein multiple biodegradation means and recirculation means are used.

28. The process of claim 15, wherein the at least one aerobic microorganism and/or the at least one enzyme is supported on a packing material.

29. The process of claim 28, wherein the packing material is a sorbent material.

30. The process of claim 28, wherein the packing material comprises activated carbon.

31. The process of claim 15, wherein the at least one aerobic microoragnism and/or the at least one enzyme is not supported on a packing material.

* * * * *